(12) United States Patent
Hamabe

(10) Patent No.: US 9,995,409 B2
(45) Date of Patent: Jun. 12, 2018

(54) FLUID-RELATED FUNCTION DEVICE

(71) Applicant: Kabushiki Kaisha Saginomiya Seisakusho, Tokyo (JP)

(72) Inventor: Yoshihiro Hamabe, Sayama (JP)

(73) Assignee: Kabushiki Kaisha Saginomiya Seisakusho, Tokyo (JP)

(*) Notice: Subject to any disclaimer, the term of this patent is extended or adjusted under 35 U.S.C. 154(b) by 93 days.

(21) Appl. No.: 15/100,358

(22) PCT Filed: Nov. 27, 2014

(86) PCT No.: PCT/JP2014/081345
§ 371 (c)(1),
(2) Date: May 31, 2016

(87) PCT Pub. No.: WO2015/083602
PCT Pub. Date: Jun. 11, 2015

(65) Prior Publication Data
US 2016/0305567 A1    Oct. 20, 2016

(30) Foreign Application Priority Data
Dec. 2, 2013 (JP) .................................. 2013-249042

(51) Int. Cl.
*H01H 35/34* (2006.01)
*F16K 27/10* (2006.01)
(Continued)

(52) U.S. Cl.
CPC ............ *F16K 27/10* (2013.01); *B21D 39/046* (2013.01); *B23K 11/002* (2013.01); *B23K 11/14* (2013.01);
(Continued)

(58) Field of Classification Search
CPC ...... B23K 9/173; B23K 9/325; B23K 35/224; B23K 37/08; B23K 9/328
(Continued)

(56) References Cited

U.S. PATENT DOCUMENTS

| 4,955,407 A | 9/1990 | Inoue |
| 7,515,202 B2 | 4/2009 | Saito et al. |

FOREIGN PATENT DOCUMENTS

| CN | 1534999 A | 10/2004 |
| JP | H01143473 | 10/1989 |

(Continued)

OTHER PUBLICATIONS

Written Opinion & International Search Report for PCT/JP2014/081345 dated Feb. 24, 2015, 8 pages.
(Continued)

*Primary Examiner* — Ahmed Saeed
(74) *Attorney, Agent, or Firm* — Reising Ethington P.C.

(57) ABSTRACT

The present invention provides a fluid-related function device capable of suppressing deformation of a connection member and a case part which may adversely be generated by expansion of fluid stored in a space in which spatters at the time of resistance-welding are trapped. A pressure switch includes a space in which spatters generated at the time of projection-welding are trapped. The space is provided between a joint and a cap member. A communication passage brings inside and outside of the space into communication with each other. The communication passages is formed such that it permits fluid to pass through the communication passages and restrains spatters from passing through the communication passages.

7 Claims, 16 Drawing Sheets

(51) Int. Cl.
  *B23K 11/14* (2006.01)
  *B23K 11/00* (2006.01)
  *B23K 11/20* (2006.01)
  *B21D 39/04* (2006.01)
  *B23K 103/22* (2006.01)

(52) U.S. Cl.
  CPC ............. *B23K 11/20* (2013.01); *H01H 35/34* (2013.01); *B23K 2203/22* (2013.01)

(58) Field of Classification Search
  USPC .................... 219/137.43, 121.63, 136, 125.1
  See application file for complete search history.

(56) References Cited

FOREIGN PATENT DOCUMENTS

| | | | | |
|---|---|---|---|---|
| JP | H1122849 | | 1/1999 | |
| JP | 2006205231 | * | 8/2006 | ............. B23K 11/14 |

OTHER PUBLICATIONS

English Translation of International Search Report for PCT/JP2014/081345 dated Feb. 24, 2015, 2 pages.
CN Office Action for CN Application No. 201480057513.4 dated Mar. 1, 2017 (15 pages).

\* cited by examiner

FLUID-RELATED FUNCTION DEVICE

TECHNICAL FIELD

The present invention relates to pressure sensitive device such as a pressure switch and a pressure sensor connected to a pipe through which fluid such as refrigerant flows, and to a fluid-related function device having a function related to fluid such as a valve gear which controls a flow rate of fluid flowing through the pipe.

BACKGROUND ART

As a conventional fluid-related function device connected to a pipe of a fluid circuit through which fluid such as refrigerant flows, there is a pressure switch disclosed in Patent Literature 1 for example. As shown in FIG. 16, the conventional pressure switch 801 includes a joint 810 made of brass and a lid member 820 made of stainless steel. The joint 810 and the lid member 820 are diffusion bonded to each other by projection-welding (resistance-welding). The joint 810 is connected to a pipe of a fluid circuit (not shown), and fluid is introduced into the lid member 820 through an interior hole 812 in a central portion of the joint 810 and a through hole 822 of the lid member 820.

The pressure switch 801 is provided with an outer projection 815 (projection) and an inner projection 816 for projection-welding. Spatters generated when the outer projection 815 is bonded to the lid member 820 by the projection-welding are trapped in a space formed between the outer projection 815 and the inner projection 816.

The pressure switch 801 is formed such that a projecting height of the inner projection 816 is lower than that of the outer projection 815 and a gap is provided between the inner projection 816 and the lid member 820 so that the inner projection 816 is not welded together with the outer projection 815 when the projection-welding is carried out. However, if this gap is large, there is fear that spatters to be trapped in the space flow out into the pipe, and if the gap is small, there is fear that the inner projection 816 is welded and spatters generated at that time flow out into the pipe and there is a problem that it is difficult to adjust the gap.

As a structure to solve such a problem, the following structure can be considered.

A pressure switch 901 shown in FIG. 17 includes a joint 910 made of brass and a cap member 920 made of stainless steel. The joint 910 has a flat surface 912. The flat surface 912 includes a cylindrical portion 913 which is in communication with a continuity passage 911b, and an annular chevron-shaped projection 917 which is placed coaxially with the cylindrical portion 913 and which is projection-welded to the cap member 920. An inner hole 924 into which the cylindrical portion 913 is inserted opens from a center of the cap member 920.

The joint 910 and the cap member 920 are assembled as follows. First, the cylindrical portion 913 of the joint 910 is inserted into the inner hole 924 of the cap member 920 and in this state, the projection 917 of the joint 910 and the cap member 920 are bonded to each other through projection-welding. A load is outwardly applied to a peripheral edge 915 of the inner hole 914 of the cylindrical portion 913 centering on an axis L, and the peripheral edge 915 is crimped such that the peripheral edge 915 is superposed, over its entire periphery, on a peripheral edge 925 of the inner hole 924 of the cap member 920.

According to this, spatters generated when the joint 910 and the cap member 920 are projection-welded to each other are stored in a space β between the joint 910 and the cap member 920 inside the annular projection 917, and since the peripheral edge 915 of the cylindrical portion 913 is crimped by the peripheral edge 925, the spatters are trapped in the space β. Hence, at the time of actual operation when the pressure switch 901 is connected to a pipe of a fluid circuit, it is possible to restrain spatters from flowing out into the fluid circuit.

CITATION LIST

Patent Literature

Patent Literature 1: JP 2006-205231 A

SUMMARY OF INVENTION

Technical Problem

According to the above-described pressure switch 901, however, the peripheral edge 915 of the inner hole 914 of the cylindrical portion 913 is crimped such that the peripheral edge 915 is superposed, over its entire periphery, on the peripheral edge 925 of the inner hole 924 of the cap member 920. Therefore, the peripheral edge 915 and the peripheral edge 925 are not completely sealed. Hence, as shown in FIG. 18, fluid R gradually enters from the crimped portion at the time of the actual operation and the fluid R is stored in the space β in some case. If temperature of fluid flowing in the pipe is changed and abruptly rises by a switching operation of the fluid circuit in a state where fluid R is stored in the space β, there is fear that the fluid R in the space β vaporizes and expands, and pressure in the space β rises, and the joint 910 and the cap member 920 are deformed.

Hence, it is an object of the present invention to provide a fluid-related function device capable of restraining, from deforming, a connection member and a case part which may adversely be deformed by expansion of fluid stored in a space in which spatters at the time of resistance-welding are trapped.

Solution to Problem

In order to solve the above issue, according to a first aspect of the invention, there is provided a fluid-related function device including: a metal connection member formed with an inner hole through which fluid flows; and a metal case part formed with another inner hole superposed on the former inner hole, the connection member and the case part being bonded to each other by projection-welding which is carried out annularly to surround the respective inner holes, wherein an entire peripheral edge of the inner hole of one of the connection member and the case part is crimped and connected to the other such that a closed space is formed between the connection member and the case part inside a location where the projection-welding is carried out, at least one of the connection member and the case part is provided with a communication passage which brings inside and outside of the space into communication with each other, and the communication passage is formed such that it permits the fluid to pass through the communication passage and restrains spatters generated by the projection-welding from passing through the communication passage.

In order to solve the above issue, according to a second aspect of the invention, there is provided a fluid-related function device including: a metal connection member formed with an inner hole through which fluid flows; and a metal case part formed with another inner hole superposed on the former inner hole, the connection member and the case part being bonded to each other by projection-welding which is carried out annularly to surround the respective inner holes, wherein an entire peripheral edge of the inner hole of one of the connection member and the case part is crimped and connected to the other such that a closed space is formed between the connection member and the case part inside a location where the projection-welding is carried out, the fluid-related function device is provided with a communication passage, the communication passage passes through an annular contact region between the connection member and the case part in which the peripheral edge of the inner hole of the one of the connection member and the case part is crimped and connected to the other, and the communication passage brings inside and outside of the space into communication with each other, and the communication passage is formed such that it permits the fluid to pass through the communication passage and restrains spatters generated by the projection-welding from passing through the communication passage.

In the invention of the second aspect, according to the invention of a third aspect, the communication passage includes one or a plurality of grooves formed in the connection member or the case part.

In the invention of the third aspect, according to the invention of a fourth aspect, the plurality of grooves are provided, and the grooves are placed at a distance from one another in an entire circumferential direction of the contact region.

In the invention of the third aspect, according to the invention of a fifth aspect, the plurality of grooves are provided, and the grooves are placed in a lattice form at least in the entire contact region.

In the invention of the second aspect, according to the invention of a sixth aspect, concave portions are configured by surface roughening which is carried out at least on one of the connection member and the case part, and the communication passage is configured by connecting the concave portions to one another.

In the invention of the sixth aspect, according to the invention of a seventh aspect, the surface roughening is carried out at least on the entire contact region.

Advantageous Effects of Invention

According to the invention described in the first aspect, there is provided a fluid-related function device including: a metal connection member formed with an inner hole through which fluid flows; and a metal case part formed with another inner hole superposed on the former inner hole of the connection member. The connection member and the case part are bonded to each other by projection-welding which is carried out annularly to surround the respective inner holes. An entire peripheral edge of the inner hole of one of the connection member and the case part is crimped and connected to the other such that a closed space is formed between the connection member and the case part inside a location where the projection-welding is carried out. At least one of the connection member and the case part is provided with a communication passage which brings inside and outside of the space between the connection member and the case part into communication with each other. The communication passage is formed such that it permits the fluid to pass through the communication passage and restrains spatters generated by the resistance-welding from passing through the communication passage.

According to this configuration, spatters generated at the time of resistance-welding are trapped in the space formed between the connection member and the case part, and fluid can flow inside and outside of the space through the communication passage. Hence, even if fluid stored in the space in which spatters at the time of resistance-welding are trapped expands and pressure in the space rises, the pressure can be released from the communication passage. Therefore, it is possible to suppress deformation of the connection member and the case part which may adversely be generated by expansion of fluid stored in the space in which spatters at the time of resistance-welding are trapped.

According to the invention described in the second aspect, there is provided a fluid-related function device including: a metal connection member formed with an inner hole through which fluid flows; and a metal case part formed with another inner hole superposed on the former inner hole of the connection member. The connection member and the case part are bonded to each other by projection-welding which is carried out annularly to surround the respective inner holes. An entire peripheral edge of the inner hole of one of the connection member and the case part is crimped and connected to the other such that a closed space is formed between the connection member and the case part inside a location where the projection-welding is carried out. The fluid-related function device is provided with a communication passage. The communication passage passes through an annular contact region between the connection member and the case part in which the peripheral edge of the inner hole of the one of the connection member and the case part is crimped and connected to the other, and the communication passage brings inside and outside of the space between the connection member and the case part into communication with each other. The communication passage is formed such that it permits the fluid to pass through the communication passage and restrains spatters generated by the resistance-welding from passing through the communication passage.

According to this configuration, spatters generated at the time of resistance-welding are trapped in the space formed between the connection member and the case part, and fluid can flow through inside and outside of the space through the communication passage. According to this, even if fluid stored in the space in which spatters at the time of resistance-welding are trapped expands and pressure in the space rises, the pressure can be released from the communication passage. Hence, it is possible to suppress deformation of the connection member and the case part which may adversely be generated by expansion of fluid stored in the space in which spatters at the time of resistance-welding are trapped.

According to the invention described in the third aspect, the communication passage includes one or a plurality of grooves formed in the connection member or the case part. According to this configuration, the communication passage can be configured by the groove which can easily be formed by press working, cutting working or laser irradiation. Hence, it is possible to more easily suppress deformation of the connection member and the case part which may adversely be generated by expansion of fluid stored in the space in which spatters at the time of resistance-welding are trapped.

According to the invention described in the fourth aspect, the plurality of grooves is provided, and the grooves are placed at a distance from one another in an entire circumferential direction of the contact region. According to this configuration, since the plurality of communication passages are substantially evenly placed in the circumferential direction of the space formed between the connection member and the case part, pressure in the space can substantially evenly be released in the circumferential direction. Hence, it is possible to further suppress deformation of the connection member and the case part which may adversely be generated by expansion of fluid stored in the space in which spatters at the time of resistance-welding are trapped.

According to the invention described in the fifth aspect, the plurality of grooves configuring the communication passage is provided, and the grooves are placed in a lattice form at least in the entire contact region. According to this configuration, since the plurality of communication passages are substantially evenly placed in the circumferential direction of the space formed between the connection member and the case part, pressure in the space can substantially evenly be released in the circumferential direction. Hence, it is possible to further suppress deformation of the connection member and the case part which may adversely be generated by expansion of fluid stored in the space in which spatters at the time of resistance-welding are trapped.

According to the invention described in the sixth aspect, concave portions are configured by surface roughening which is carried out at least on one of the connection member and the case part, and the communication passage is configured by connecting the concave portions to one another. According to this configuration, communication passage can be configured by connecting, to one another, a plurality of concave portions of numerous convex portions and concave portions formed by surface roughening which can easily be carried out such as sandblasting working, etching working, laser working and scratching working. Hence, it is possible to more easily suppress the deformation of the connection member and the case part which may adversely be generated by expansion of fluid stored a space in which spatters at the time of resistance-welding are trapped.

According to the invention described in the seventh aspect, the surface roughening is carried out at least on the entire contact region. According to this configuration, the communication passages are formed in the entire contact region substantially in a mesh form. That is, the plurality of communication passages are placed substantially evenly in the circumferential direction of the space formed between the connection member and the case part. Therefore, pressure in the space can be released substantially evenly in the circumferential direction. Hence, it is possible to further suppress the deformation of the connection member and the case part which may adversely be generated by the expansion of fluid stored in the space in which spatters at the time of resistance-welding are trapped.

BRIEF DESCRIPTION OF DRAWINGS

FIGS. 5A and 5B show a configuration of a modification (Modification 1) of the pressure switch of the first embodiment, in which FIG. 5A is a sectional view before the joint and the cap member are bonded to each other, and FIG. 5B is a sectional view after they are bonded to each other.

FIGS. 6A and 6B show a configuration of a modification (Modification 2) of the pressure switch of the first embodiment, in which FIG. 6A is a sectional view before the joint and the cap member are bonded to each other, and FIG. 6B is a sectional view after they are bonded to each other.

FIGS. 7A and 7B show a configuration of a modification (Modification 3) of the pressure switch of the first embodiment, in which FIG. 7A is a sectional view before the joint and the cap member are bonded to each other, and FIG. 7B is a sectional view after they are bonded to each other.

FIGS. 8A and 8B show a configuration of a modification (Modification 4) of the pressure switch of the first embodiment, in which FIG. 8A is a sectional view before the joint and the cap member are bonded to each other, and FIG. 8B is a sectional view after they are bonded to each other.

FIGS. 9A and 9B show a configuration of a modification (Modification 5) of the pressure switch of the first embodiment, in which FIG. 9A is a sectional view before the joint and the cap member are bonded to each other, and FIG. 9B is a sectional view after they are bonded to each other.

FIGS. 10A and 10B show a configuration of a modification (Modification 6) of the pressure switch of the first embodiment, in which FIG. 10A is a sectional view before a copper pipe and the cap member are bonded to each other, and FIG. 10B is a sectional view after they are bonded to each other.

DESCRIPTION OF EMBODIMENTS

First Embodiment

Next, a pressure switch according to a first embodiment of the present invention will be described with reference to FIGS. 1 to 4.

Figure 1:
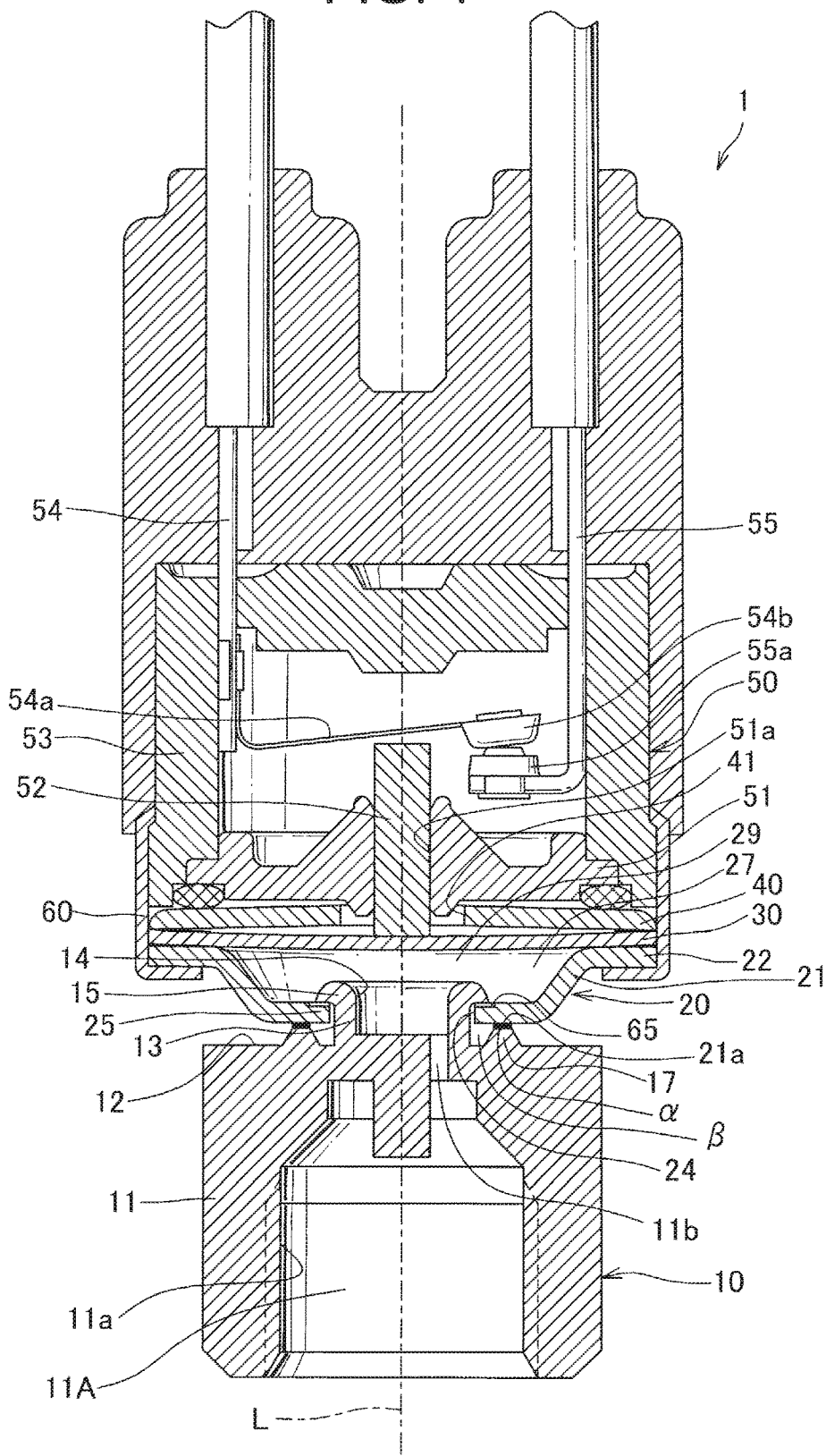
FIG. 1 is a vertical sectional view of a pressure switch according to a first embodiment of the present invention.
Figure 2A:
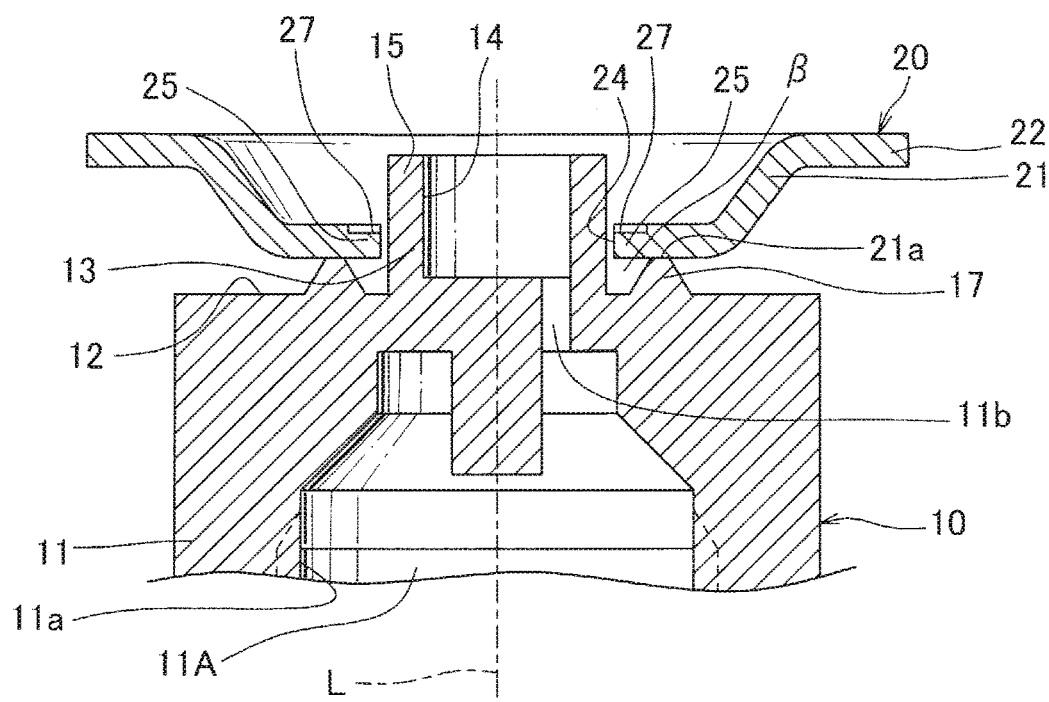
FIG. 2A is a sectional view before a joint and a cap member of the pressure switch in FIG. 1 are bonded to each other.
Figure 2B:
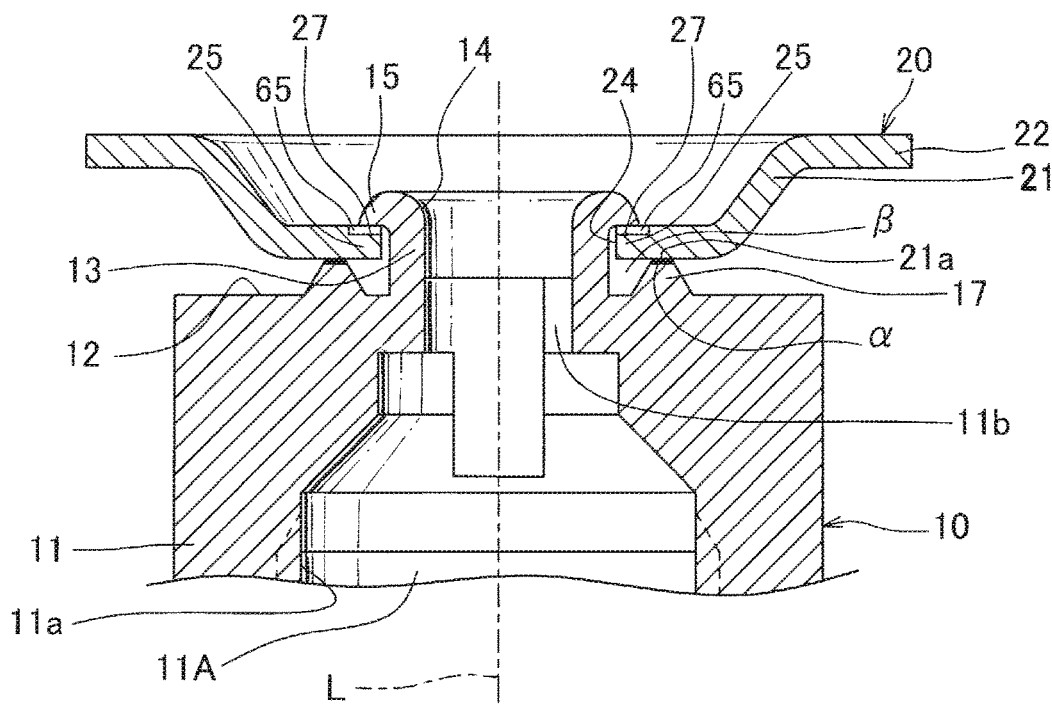
FIG. 2B is a sectional view after they are bonded to each other.
Figure 3A:
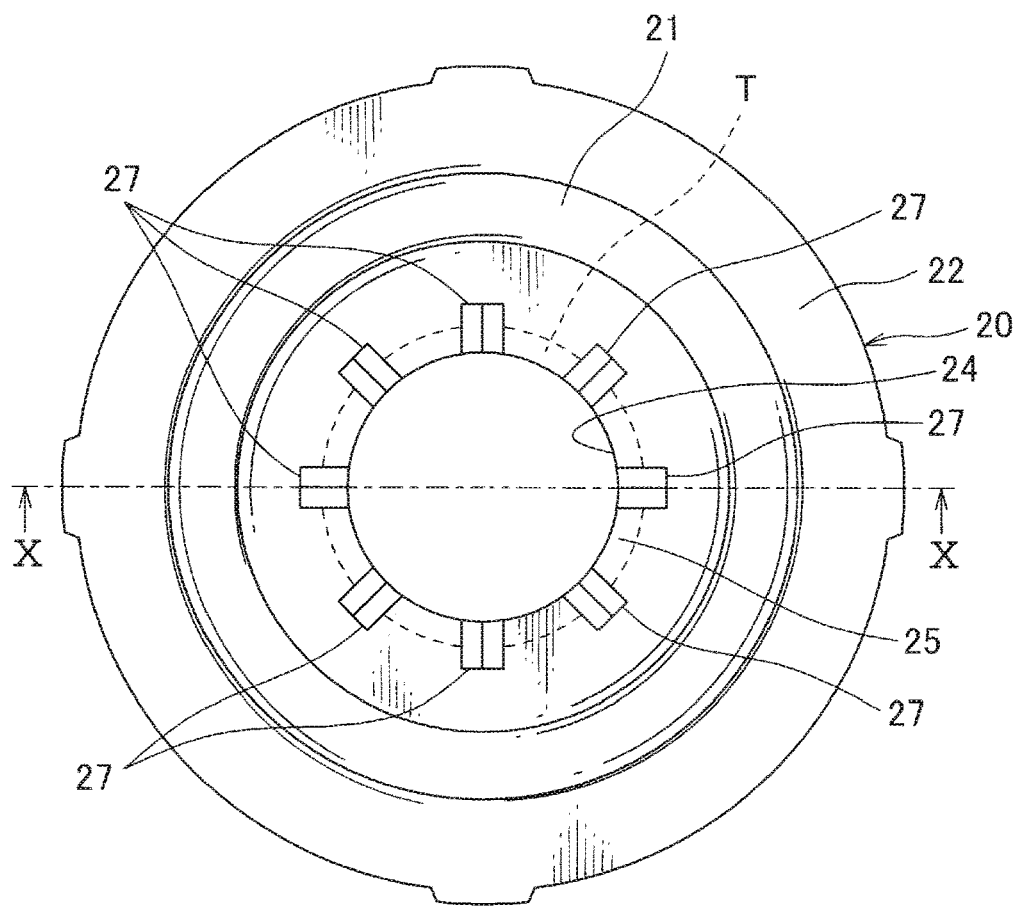
FIG. 3A is a plan view of the cap member of the pressure switch in FIG. 1.
Figure 3B:
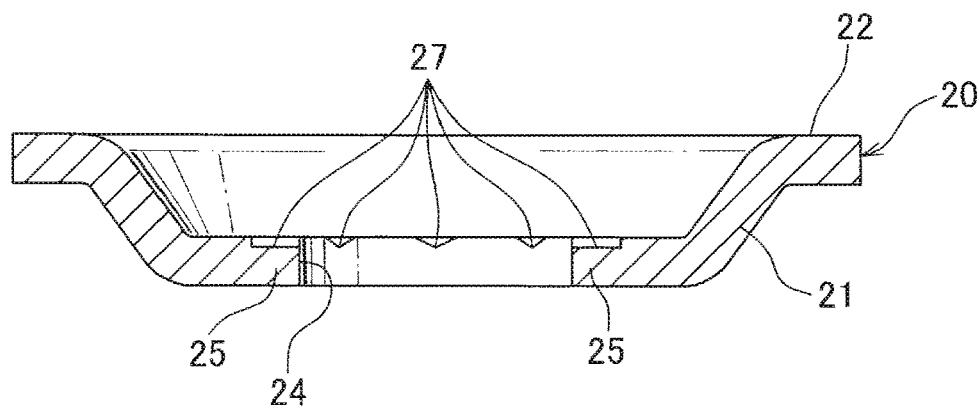
FIG. 3B is a sectional view taken along line X-X in FIG. 3A.
Figure 4:
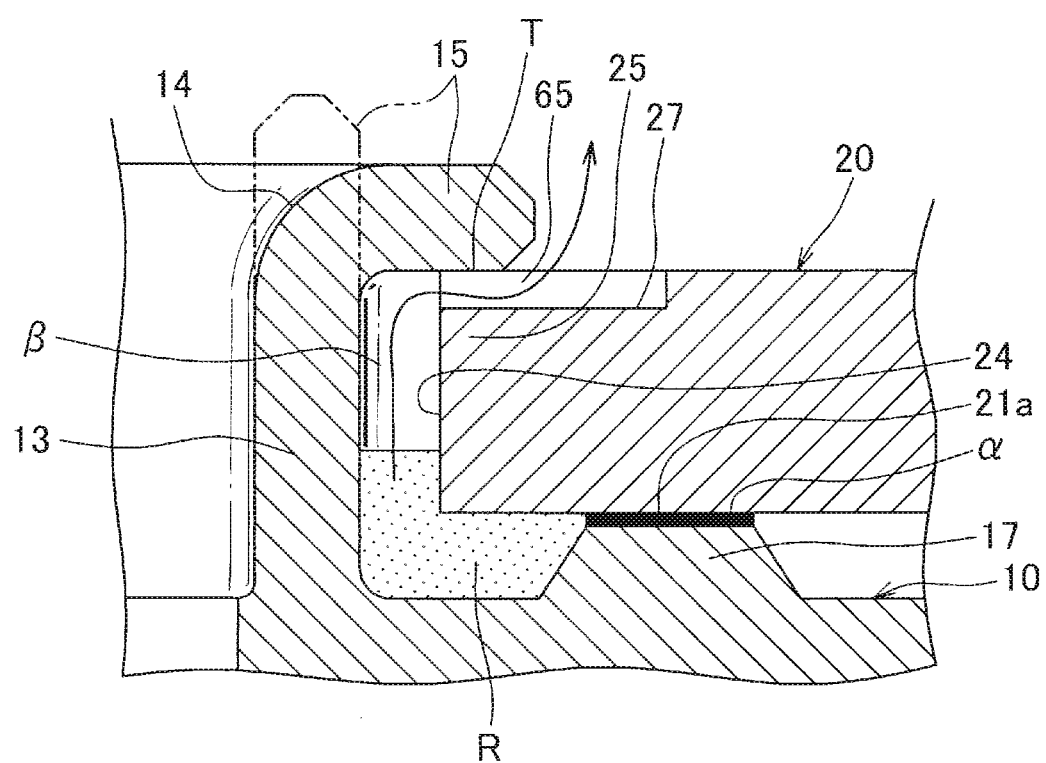
FIG. 4 is an enlarged sectional view of a space between the joint and the cap member in the pressure switch in FIG. 1.

FIG. 1 is a vertical sectional view of the pressure switch according to the first embodiment of the present invention. FIG. 2A is a sectional view before a joint and a cap member of the pressure switch in FIG. 1 are bonded to each other, and FIG. 2B is a sectional view after they are bonded to each other. FIG. 3A is a plan view of the cap member of the pressure switch in FIG. 1, and FIG. 3B is a sectional view taken along line X-X in FIG. 3A. FIG. 4 is an enlarged sectional view of a space between the joint and the cap member in the pressure switch in FIG. 1.

This pressure switch is one example of a pressure sensitive device. The pressure switch is connected to a pipe through which fluid to be detected such as refrigerant flows, and configures a fluid circuit. The pressure switch is opened and closed in accordance with pressure of the fluid.

As shown in FIG. 1, the pressure switch 1 includes a joint 10 made of brass which is a copper-based member as a connection member, a cap member 20 made of stainless steel as a case part, a disk 30, a stopper 40, a switch portion 50, and an outer cover 60 formed from a stainless steel thin plate.

The joint 10 includes a body portion 11 having a flat surface 12 opposed to the later-described cap member 20. A female thread 11a to be threadedly fitted over a pipe (not shown) is formed in an inside of the body portion 11. The flat surface 12 of the joint 10 is provided with a cylindrical portion 13 and a projection 17 as an annular portion.

The cylindrical portion 13 is formed into a cylindrical shape having an axis which is superposed on an axis L, and an inner hole 14 opens in the cylindrical portion 13. The inner hole 14 is in communication with a screw chamber 11A of the body portion 11 through a continuity passage 11b of the body portion 11.

The projection 17 is formed such that it projects into an annular chevron-shape centering on the axis L. The projection 17 is placed at a position separated away from the cylindrical portion 13 such that the projection 17 surrounds a periphery of the cylindrical portion 13.

The cap member 20 is composed of a bowl-shaped portion 21 having a bowl shape and an annular flange portion 22 on an outer periphery of the cap member 20. A circular inner hole 24 opens at a center of the bowl-shaped portion 21. A diameter of the inner hole 24 is larger than an outer diameter of the cylindrical portion 13 and smaller than an inner diameter of the projection 17.

The joint 10 and the cap member 20 are bonded to each other by the projection-welding and crimping. In this embodiment, the welded portion area and the crimped portion area have rotationally symmetric shapes having an axis L as a rotation axis.

As shown in FIG. 2A, the cylindrical portion 13 of the joint 10 is inserted into the inner hole 24 of the cap member 20. According to this, the inner hole 14 of the cylindrical portion 13 and the inner hole 24 of the cap member 20 are placed such that axes of the inner holes 14, 24 are superposed on each other, and the screw chamber 11A and an interior of the bowl-shaped portion 21 of the cap member 20 are in communication with each other. The projection 17 abuts against an annular portion 21a. The annular portion 21a surrounds a periphery of the inner hole 24 on a surface of the bowl-shaped portion 21 on the side of the joint 10 (surface facing downward in drawing). The annular portion 21a is located at a position separated away from the inner hole 24. The annular portion 21a and the projection 17 are bonded to each other by projection-welding as shown in FIG. 2B. The projection-welding is carried out in an annular form surrounding the inner hole 14 of the joint 10 and the inner hole 24 of the cap member 20.

A welded portion α is formed between the projection 17 and the annular portion 21a by this projection-welding. The projection 17 projects from the flat surface 12. Therefore, a space β is formed between the joint 10 and the cap member 20 radially inside of the projection 17. The space β is surrounded by the flat surface 12 of the joint 10, the cylindrical portion 13, the projection 17 and a surface of the bowl-shaped portion 21 of the cap member 20 on the side of the joint 10.

A peripheral edge 15 of the inner hole 14 of the cylindrical portion 13 is crimped such that the peripheral edge 15 is superposed on a peripheral edge 25 of the inner hole 24 of the cap member 20 by outwardly applying a load to the peripheral edge 15 centering on the axis L. According to this, the peripheral edge 15 of the inner hole 14 of the cylindrical portion 13 is brought into contact with the peripheral edge 25 of the inner hole 24 of the cap member 20 under pressure, and the space β is sealed such that it becomes a closed space.

According to this, spatters generated when the joint 10 and the cap member 20 are projection-welded to each other are stored in the space β. The space β is sealed by crimping of the peripheral edge 15 of the inner hole 14 of the cylindrical portion 13, and the spatters are trapped in the space β.

As shown in FIGS. 3A and 3B, a plurality of grooves 27 are formed in the peripheral edge 25 of the inner hole 24 of the cap member 20. The grooves 27 extend radially from a center of the peripheral edge 25, and the grooves 27 have V-shaped cross sections. The plurality of grooves 27 are formed such that they cross (pass through), in the radial direction, an annular contact region T between the peripheral edge 15 of the inner hole 14 of the cylindrical portion 13 formed by the above-described crimping and the peripheral edge 25 of the inner hole 24 of the cap member 20. In this embodiment, the plurality of grooves 27 is placed at equal distances from one another in the entire circumferential direction of the contact region T. Although it is preferable that the plurality of grooves 27 are placed at equal distances from one another in the entire circumferential direction of the contact region T, the grooves 27 may be placed at different distances from one another in the entire circumferential direction of the contact region T. Alternatively, only one groove 27 may be provided.

These grooves 27 are formed such that groove widths and groove depths are equal to or smaller than a maximum diameter (e.g., 0.8 mm) which permits spatters generated by the projection-welding to flow out into the pipe. These grooves 27 are formed into such lengths that one ends of the grooves 27 are exposed to inside the bowl-shaped portion 21 when the peripheral edge 15 of the inner hole 14 of the cylindrical portion 13 is superposed on the peripheral edge 25 of the inner hole 24 of the cap member 20. In this embodiment, the groove widths and the groove depths are 0.2 mm. As shown in FIG. 4, since the peripheral edge 15 of the inner hole 14 of the cylindrical portion 13 is crimped, if the peripheral edge 15 is superposed on the peripheral edge 25 of the inner hole 24 of the cap member 20, portions of openings of the plurality of grooves 27 are closed, and a plurality of communication passages 65 which bring inside and outside of the space β (more specifically, space β and later-described pressure chamber 29) into communication with each other is formed.

The plurality of communication passages 65 restrains spatters generated by the projection-welding (resistance-welding) existing in the space β from passing through the communication passages 65. More specifically, since the plurality of communication passages 65 is composed of the plurality of grooves 27, their thicknesses (inner diameters) become equal to or smaller than the maximum diameter which permits spatters to flow out into the pipe connected to the pressure switch 1, and this restrains spatters exceeding the maximum diameter from passing.

The disk 30 is made of metal such as thin film stainless steel for example, its central portion is formed into a spherical surface having a large radius of curvature, and its outer peripheral portion is formed into a flat disk shape. The disk 30 is superposed on an upper side of the cap member 20 in the drawing such that its central portion becomes a convex shape toward the cap member 20. Since the disk 30 is superposed on the cap member 20, the pressure chamber 29 is formed between the bowl-shaped portion 21 and the disk 30.

The stopper 40 is made of metal such as stainless steel, an outer diameter of the stopper 40 is substantially equal to that of the disk 30, and the stopper 40 is formed into an annular shape provided at its central portion with an opening 41. The stopper 40 is superposed on an upper side of the disk 30 in the drawing.

The switch portion 50 includes a guide 51 provided at its central portion with a shaft hole 51a, a drive shaft 52 fitted and inserted into the shaft hole 51a of the guide 51, and a cylindrical terminal stage 53 fitted around the guide 51. A first terminal 54 and a second terminal 55 are fixed to the terminal stage 53, and a contact plate 54a is mounted on the first terminal 54. A first contact 54b is mounted on the contact plate 54a, and a second contact 55a is mounted on the second terminal 55. In this embodiment, at the time of normal state where pressure is less than preset pressure, the switch portion 50 is closed (normally closed) where the first contact 54b is in contact with the second contact 55a.

The outer cover 60 is formed of stainless steel or copper thin plate, and the outer cover 60 fixes outer peripheral portions of the cap member 20, the disk 30, the stopper 40 and the terminal stage 53 to each other by crimping.

According to this configuration, fluid flowing through the pipe is introduced into the pressure chamber 29 of the cap member 20 through the joint 10, the disk 30 is deformed in accordance with pressure of the fluid and the drive shaft 52 is pushed. If the pressure becomes equal to or larger than the preset pressure, the first contact 54b separates from the second contact 55a in tandem with the drive shaft 52, and the switch is opened (OFF). According to this, it is possible to detect that the pressure of the fluid reaches the set pressure.

Next, an operation of the pressure switch 1 according to the present invention will be described.

Since the pressure switch 1 is connected to the pipe through which fluid to be detected flows, the pressure switch 1 configures the fluid circuit together with the pipe, and the pressure switch 1 is opened and closed (ON/OFF) in accordance with pressure of the fluid. When the fluid circuit is actually operated, fluid flows into or out from the space β between the joint 10 and the cap member 20 through the plurality of communication passages 65. At this time, the plurality of communication passages 65 restrain spatters generated at the time of projection-welding existing in the space β from passing through the communication passages 65, and this restrains spatters from flowing outside of the space β.

When temperature of fluid flowing in the pipe changes and abruptly rises due to a switching operation of the fluid circuit, the fluid in the space β expands by the vaporization. In this case, as schematically shown by an arrow in FIG. 4, the expanded portion of fluid R is released from the plurality of communication passages 65 to outside of the space β, and this restrains the pressure in the space β from rising.

According to the above, this embodiment includes the metal joint 10 formed with the inner hole 14 through which fluid flows, and the metal cap member 20 formed with the inner hole 24 which is coaxially superposed on the inner hole 14 of the joint 10. The connection member 10 and the cap member 20 are bonded to each other by the projection-welding which is carried out annularly to surround the inner holes 14 and 24. The entire circumference of the peripheral edge 15 of the inner hole 14 of the joint 10 is crimped and connected to the cap member 20 such that the closed space β is formed between the joint 10 and the cap member 20 inside the projection 17. The communication passages 65 which bring inside and outside of the space β into communication with each other is provided such that the communication passages 65 pass through the annular contact region T between the joint 10 and the cap member 20 which come into contact with each other by crimping the peripheral edge 15 of the inner hole 14 of the joint 10 to the cap member 20. The communication passages 65 are formed such that they permit fluid to pass through the communication passages 65 but restrain spatters generated by the resistance-welding from passing through the communication passages 65.

According to this, spatters generated at the time of resistance-welding are trapped in the space β formed between the joint 10 and the cap member 20, and fluid can flow inside and outside of the space β through the communication passages 65. According to this, even if fluid stored in the space β in which spatters at the time of resistance-welding are trapped expands and pressure in the space β rises, the pressure can be released outside the space β from the communication passages 65. Hence, it is possible to restrain joint 10 and the cap member 20 from deforming which may adversely generated by the expansion of fluid stored in the space β in which spatters at the time of resistance-welding are trapped.

The communication passages 65 are composed of the plurality of grooves 27 formed in the cap member 20. According to this, the communication passages 65 can be configured by the grooves 27 which can easily be formed by press working, cutting working or laser irradiation. Hence, it is possible to more easily suppress the deformation of the connection member and the case part which may adversely be generated by expansion of fluid stored in the space β in which spatters at the time of resistance-welding are trapped.

The plurality of grooves 27 which configure the communication passages 65 is provided, and the grooves 27 are placed at distances from one another in the entire circumferential direction of the contact region T. According to this, since the plurality of communication passages 65 is placed evenly in the circumferential direction of the space β formed between the joint 10 and the cap member 20, pressure in the space β can evenly be released in the circumferential direction. Hence, it is possible to further suppress the deformation of the connection member and the case part which may adversely be generated by expansion of fluid stored in the space β in which spatters at the time of resistance-welding are trapped.

Modifications of First Embodiment

Modifications of the pressure switch according to the above-described first embodiment will be described with reference to FIGS. 5 to 10.

In the following description of the modifications of the first embodiment, the same reference signs as those of the first embodiment are allocated to the same elements, and detailed description thereof will be omitted. Although only the joint and the cap member are shown in the drawings which explain the modifications, the modifications include the same constituent elements as those shown in FIG. 1 and configure the pressure switch. The following modifications also exert the same effects as those of the above-described first embodiment.

Modification 1

Figure 5A:
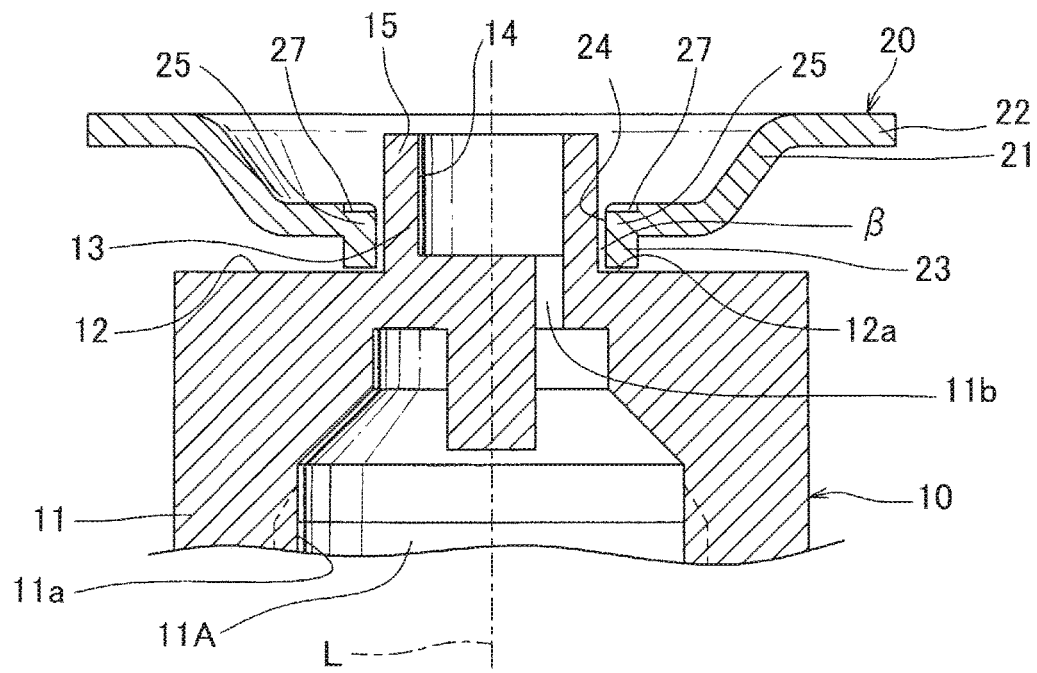
Figure 5B:
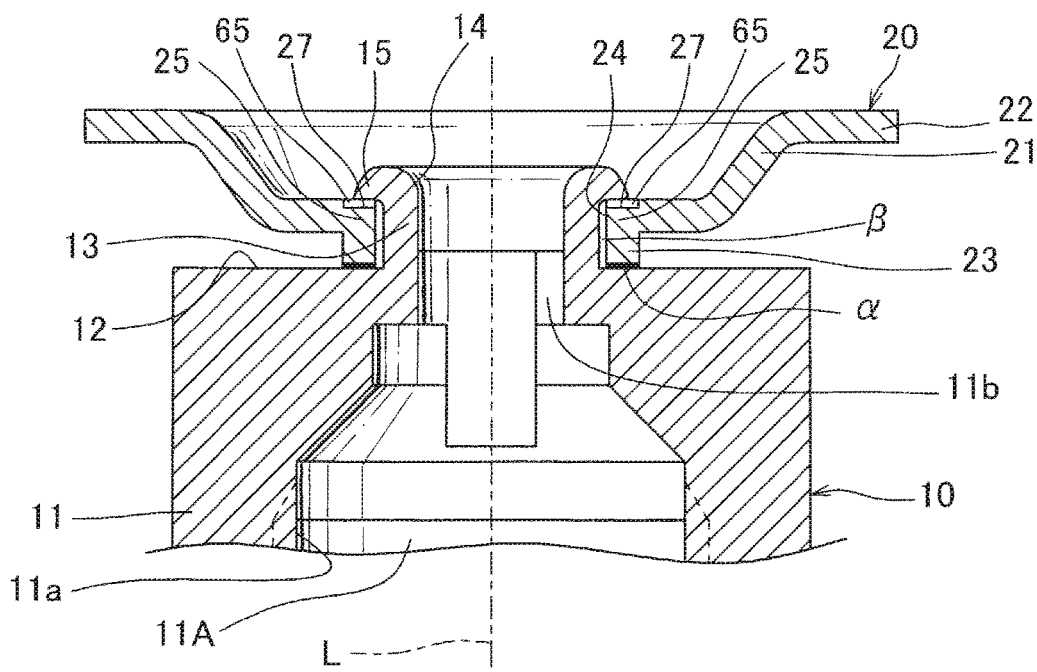

FIGS. 5A and 5B show a configuration of a modification (Modification 1) of the pressure switch of the first embodiment, in which FIG. 5A is a sectional view before the joint and the cap member are bonded to each other, and FIG. 5B is a sectional view after they are bonded to each other.

In Modification 1, as shown in FIG. 5A, a cylindrical portion 23 is formed on the bowl-shaped portion 21 of the cap member 20. The cylindrical portion 23 has a cylindrical shape formed centering on the axis L. The inner hole 24 opens at a center of the cylindrical portion 23. The cylindrical portion 13 of the joint 10 is inserted into the inner hole 24 of the cylindrical portion 23 of the cap member 20. According to this, the inner hole 14 of the cylindrical portion 13 of the joint 10 and the inner hole 24 of the cylindrical portion 23 of the cap member 20 are coaxially superposed on each other, and the screw chamber 11A and the interior of the bowl-shaped portion 21 of the cap member 20 are in communication with each other. An inner diameter of the cylindrical portion 23 is larger than an outer diameter of the cylindrical portion 13 and the cylindrical portion 23 projects from the bowl-shaped portion 21 so that the space β is formed between the cylindrical portion 13 of the joint 10 and the cylindrical portion 23 of the cap member 20. As shown in FIG. 5B, in an annular portion 12a which abuts against an end surface of the cylindrical portion 23 of the cap member 20 in the flat surface 12 of the joint 10, the body portion 11 and the cylindrical portion 23 are bonded to each other by projection-welding. This projection-welding is carried out annularly to surround the inner hole 14 of the joint 10 and the inner hole 24 of the cap member 20. According to this, the welded portion α is formed between the body portion 11 and the cylindrical portion 23. The cylindrical portion 23 corresponds to an annular portion which is projection-welded in the cap member 20.

The peripheral edge 15 of the inner hole 14 of the cylindrical portion 13 is crimped such that the peripheral edge 15 is superposed on the peripheral edge 25 of the inner hole 24 of the cap member 20 by outwardly applying a load to the peripheral edge 15 centering on the axis L. According to this, the peripheral edge 15 of the inner hole 14 of the cylindrical portion 13 is contacted with the peripheral edge 25 of the inner hole 24 of the cap member 20 under pressure, and the space β between the cylindrical portion 13 of the joint 10 and the cylindrical portion 23 of the cap member 20 is sealed such that the space β becomes a closed space.

A plurality of grooves 27 similar to those of the first embodiment are formed in the peripheral edge 25 of the cap member 20. If the peripheral edge 15 of the inner hole 14 of the cylindrical portion 13 is superposed on the peripheral edge 25 of the inner hole 24 of the cap member 20 by crimping the peripheral edge 15, portions of openings of the plurality of grooves 27 are closed, and the plurality of communication passages 65 which bring inside and outside of the space β (more specifically, space β and pressure chamber 29) into communication with each other are formed.

In this Modification 1 also, like the above-described first embodiment, spatters generated at the time of resistance-welding are trapped in the space β formed between the joint 10 and the cap member 20, and fluid can flow through inside and outside of the space β through the communication passages 65.

Modification 2

Figure 6A:
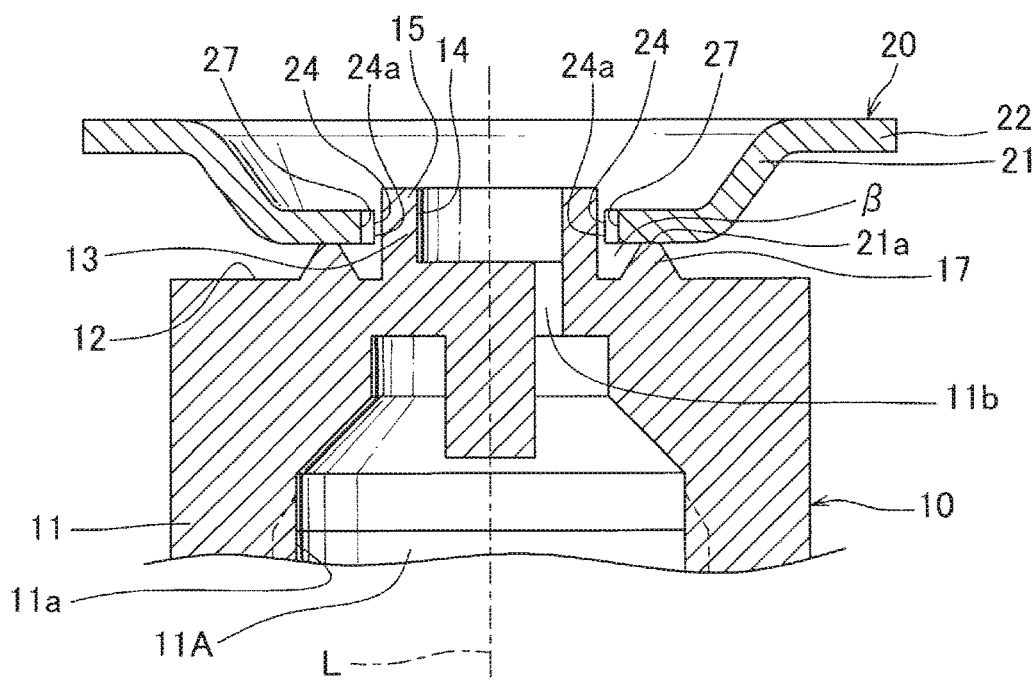
Figure 6B:
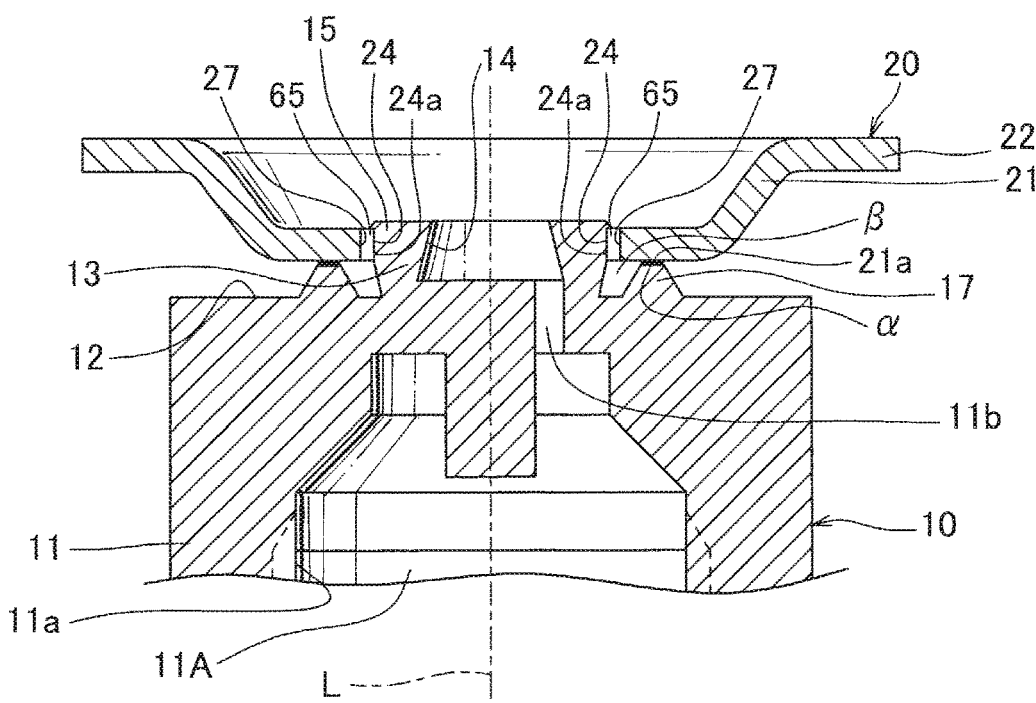

FIGS. 6A and 6B show a configuration of a modification (Modification 2) of the pressure switch of the first embodiment, in which FIG. 6A is a sectional view before the joint and the cap member are bonded to each other, and FIG. 6B is a sectional view after they are bonded to each other.

In this Modification 2, as shown in FIG. 6A, a length of the cylindrical portion 13 of the joint 10 is shorter than that of the first embodiment. As shown in FIG. 6B, if a load is applied to the cylindrical portion 13 of the joint 10 in the direction of the axis L, the cylindrical portion 13 is crushed in its length direction (vertical direction in drawing), a diameter of the peripheral edge 15 of the inner hole 14 of the cylindrical portion 13 is enlarged in the inner hole 24 of the cap member 20, and the peripheral edge 15 is crimped such that it is superposed on a peripheral surface 24a of the inner hole 24. According to this, the peripheral edge 15 of the inner hole 14 of the cylindrical portion 13 is contacted with the peripheral surface 24a of the inner hole 24 of the cap member 20 under pressure and the space β is sealed such that it becomes a closed space.

The plurality of grooves 27 having V-shaped cross sections are formed in the peripheral surface 24a of the inner hole 24 of the cap member 20. The grooves 27 extend in a penetrating direction (vertical direction in drawing) of the inner hole 24. The plurality of grooves 27 are formed such that they cross (pass through) an annular contact region between the peripheral edge 15 of the cylindrical portion 13 and the peripheral surface 24a of the inner hole 24 of the cap member 20 in the direction of the axis L by the above-described crimping. The plurality of grooves 27 are placed at distances from one another in the entire circumferential direction of the contact region.

Groove widths and groove depths of the plurality of grooves 27 are formed in the same manner as that of the first embodiment. If the peripheral edge 15 of the inner hole 14 of the cylindrical portion 13 is superposed on the peripheral surface 24a of the inner hole 24 of the cap member 20 by crimping the peripheral edge 15, the openings of the plurality of grooves 27 are closed, and the plurality of communication passages 65 which bring inside and outside of the space β (more specifically, space β and pressure chamber 29) into communication with each other are formed.

In this Modification 2 also, like the above-described first embodiment, spatters generated at the time of resistance-welding are trapped in the space β formed between the joint 10 and the cap member 20, and fluid can flow through inside and outside of the space β through the communication passages 65.

Modification 3

Figure 7A:
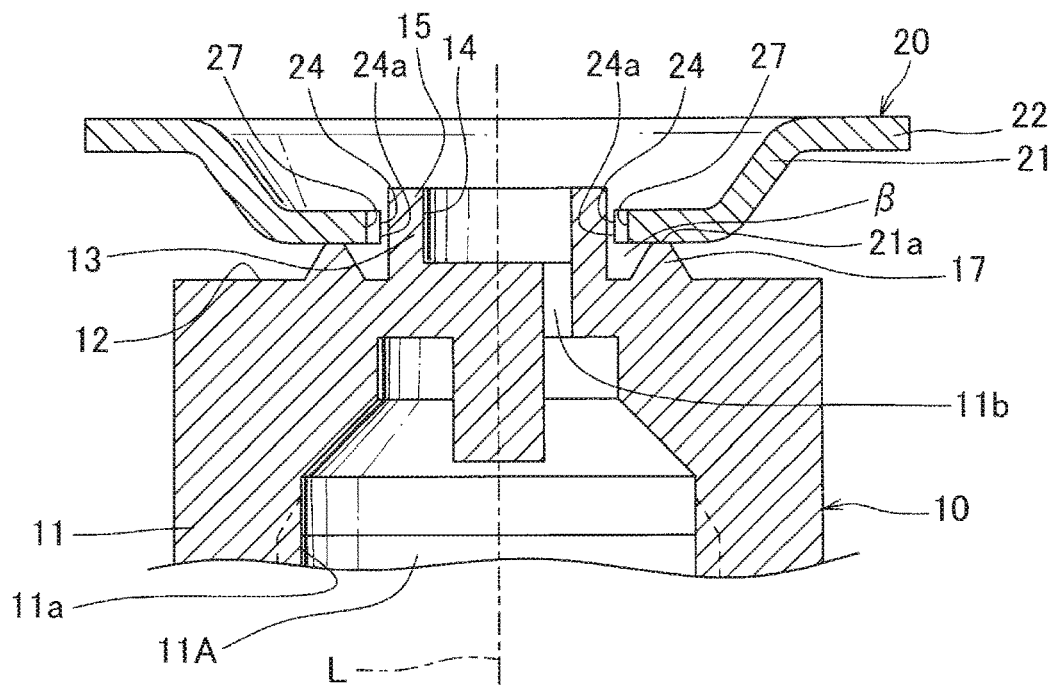
Figure 7B:
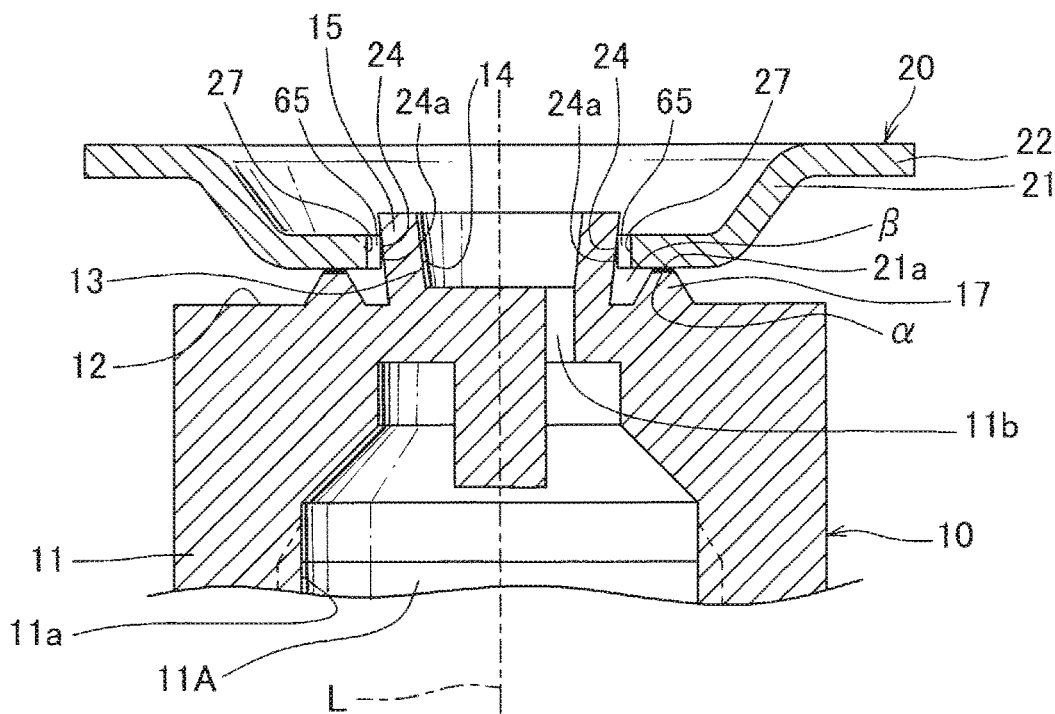

FIGS. 7A and 7B show a configuration of a modification (Modification 3) of the pressure switch of the first embodiment, in which FIG. 7A is a sectional view before the joint and the cap member are bonded to each other, and FIG. 7B is a sectional view after they are bonded to each other.

In this Modification 3, as shown in FIGS. 7A and 7B, instead of applying a load to the cylindrical portion 13 in the direction of the axis L to crimp the cylindrical portion 13 in the above-described Modification 2, a load is outwardly applied to the peripheral edge 15 of the inner hole 14 of the cylindrical portion 13 centering on the axis L to enlarge a diameter of the peripheral edge 15. According to this, the peripheral edge 15 is crimped such that it is superposed on the peripheral surface 24a of the inner hole 24 of the cap member 20. Other configurations are the same as those of Modification 2.

In this Modification 3 also, like the above-described first embodiment, spatters generated at the time of resistance-welding are trapped in the space β formed between the joint 10 and the cap member 20, and fluid can flow through inside and outside of the space β through the communication passages 65.

Modification 4

Figure 8A:
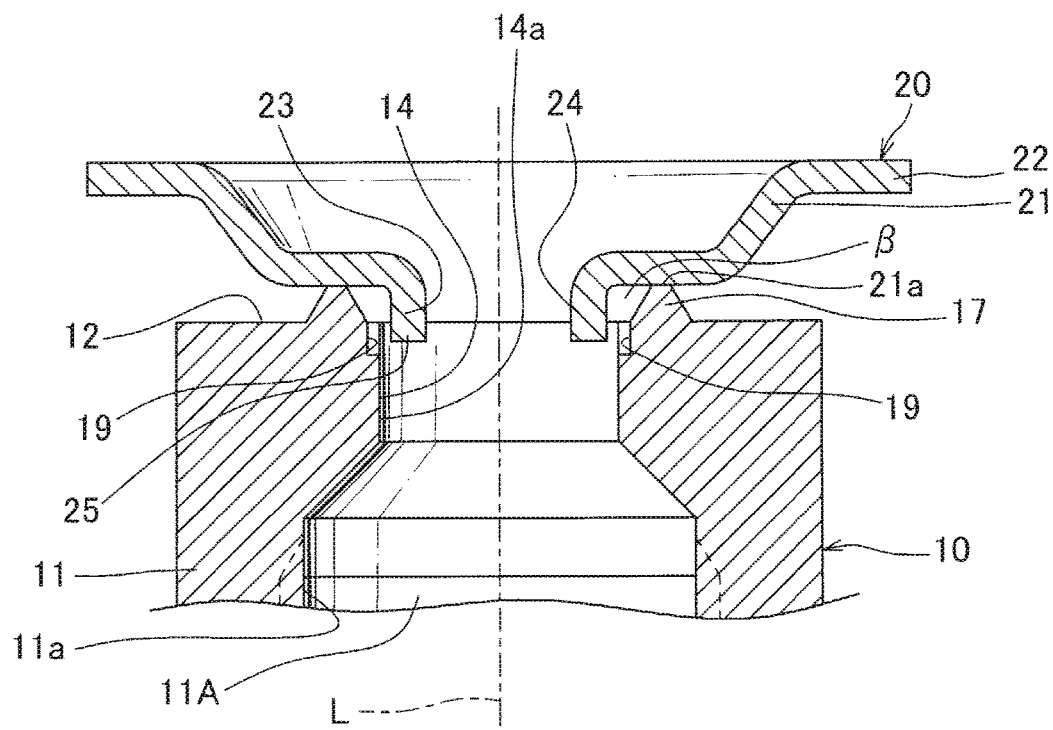
Figure 8B:
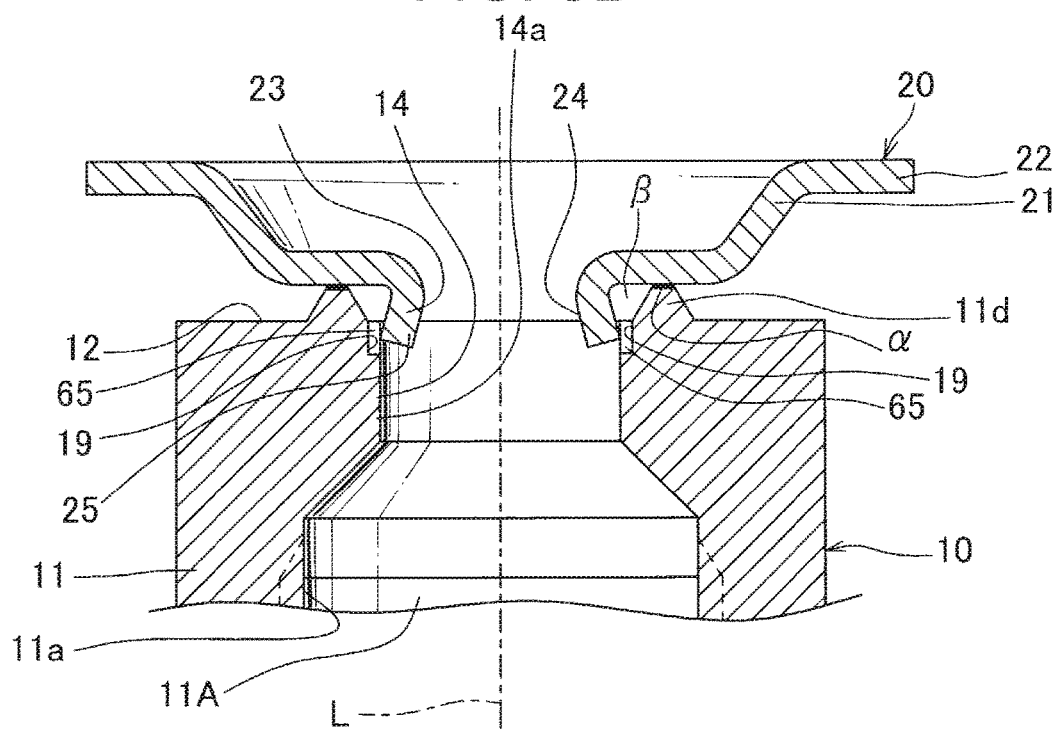

FIGS. 8A and 8B show a configuration of a modification (Modification 4) of the pressure switch of the first embodiment, in which FIG. 8A is a sectional view before the joint and the cap member are bonded to each other, and FIG. 8B is a sectional view after they are bonded to each other.

In this Modification 4, as shown in FIG. 8A, the inner hole 14 penetrating from the screw chamber 11A to the flat surface 12 is formed in the body portion 11 of the joint 10. The cylindrical portion 23 having a cylindrical shape is formed on the bowl-shaped portion 21 of the cap member 20 centering on the axis L. The inner hole 24 opens at a center of the cylindrical portion 23. The peripheral edge 25 of the cylindrical portion 23 of the cap member 20 is inserted into the inner hole 24 of the joint 10. According to this, the inner hole 14 of the joint 10 and the inner hole 24 of the cylindrical portion 23 of the cap member 20 are coaxially superposed on each other, and the screw chamber 11A and an interior of the bowl-shaped portion 21 of the cap member 20 are brought into communication with each other.

As shown in FIG. 8B, by outwardly applying a load to the peripheral edge 25 of the inner hole 24 of the cylindrical portion 23 of the cap member 20 centering on the axis L, a diameter of the peripheral edge 25 is expanded to the inner hole 14 of the joint 10, and the peripheral edge 25 is crimped such that it is superposed on a peripheral surface 14a of the inner hole 14. According to this, the peripheral edge 25 of the inner hole 24 of the cylindrical portion 23 of the cap member 20 is contacted, under pressure, with the peripheral surface 14a of the inner hole 14 of the joint 10, and the joint 10 and the cap member 20 are sealed such that the space β therebetween becomes a closed space.

A plurality of grooves 19 having V-shaped cross sections are formed in the peripheral surface 14a of the inner hole 14 of the joint 10. The grooves 19 extend in a penetrating direction (vertical direction in drawing) of the inner hole 14. These plurality of grooves 19 are formed such that they cross (pass through) an annular contact region between the peripheral surface 14a of the inner hole 14 of the joint 10 by the above-described crimping and the peripheral edge 25 of the inner hole 24 of the cylindrical portion 23 of the cap member 20 in the direction of the axis L. The plurality of grooves 19 are placed at distances from one another in the entire circumferential direction of the contact region.

Groove widths and groove depths of the plurality of grooves 19 are formed in the same manner as the plurality of grooves 27 in the above-described first embodiment. If the peripheral edge 25 of the inner hole 24 of the cylindrical portion 23 is superposed on the peripheral surface 14a of the inner hole 14 of the joint 10 by crimping the peripheral edge 25, portions of the openings of the plurality of grooves 19 are closed, and the plurality of communication passages 65 which bring inside and outside of the space β (more specifically, space β and inner hole 14) into communication with each other are formed.

In this Modification 4 also, like the above-described first embodiment, spatters generated at the time of resistance-welding are trapped in the space β formed between the joint 10 and the cap member 20, and fluid can flow through inside and outside of the space β through the communication passages 65.

Modification 5

Figure 9A:
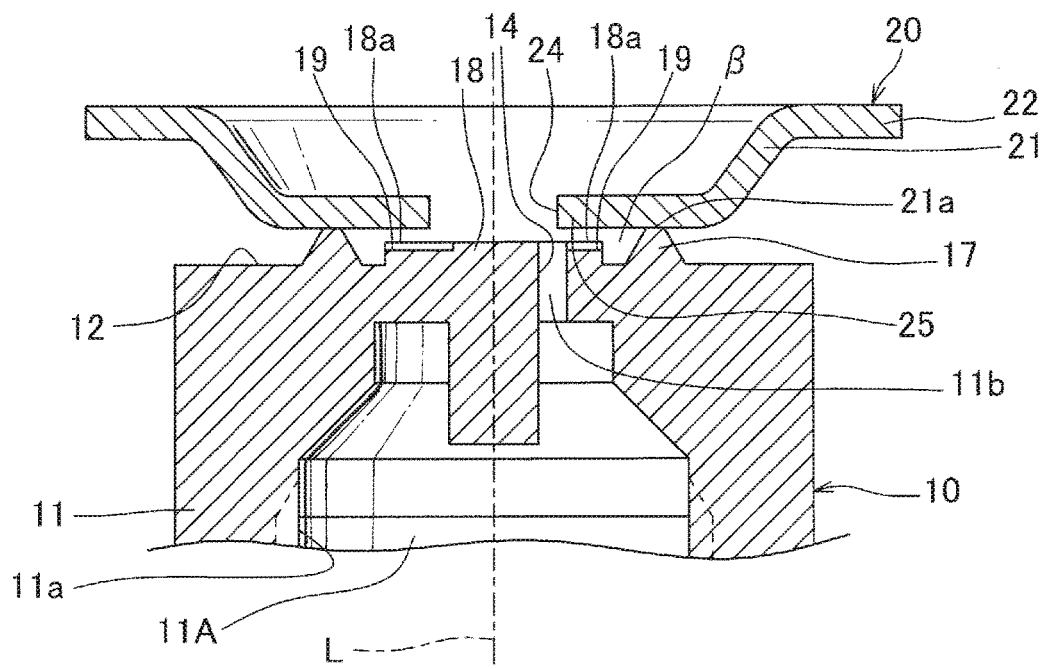
Figure 9B:
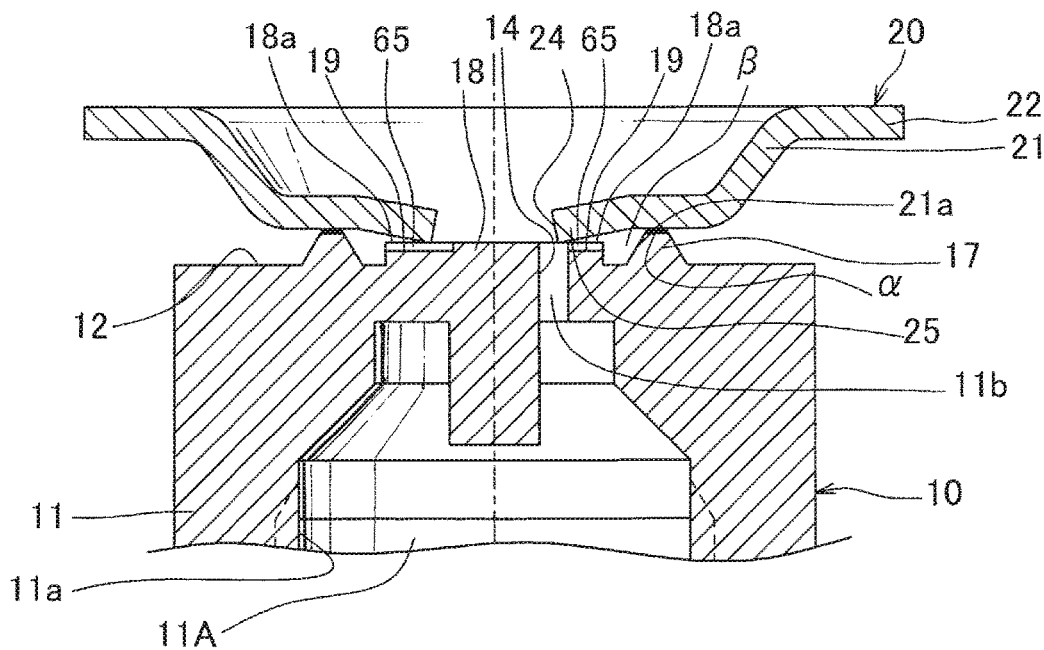

FIGS. 9A and 9B show a configuration of a modification (Modification 5) of the pressure switch of the first embodiment, in which FIG. 9A is a sectional view before the joint and the cap member are bonded to each other, and FIG. 9B is a sectional view after they are bonded to each other.

In this Modification 5, as shown in FIG. 9A, a pedestal 18 which is circular in shape as viewed from above is formed inside the projection 17 of the flat surface 12 of the joint 10. The pedestal 18 has an inner hole 14. As shown in FIG. 9B, by applying a load to the peripheral edge 25 of the inner hole 24 of the cap member 20 in the direction of the axis L, the peripheral edge 25 is bent and deformed toward the pedestal 18 of the joint 10, and the peripheral edge 25 of the inner hole 24 of the cap member 20 is crimped such that the peripheral edge 25 is superposed on a peripheral edge 18a of the pedestal 18. According to this, the peripheral edge 25 of the inner hole 24 of the cap member 20 is contacted with the peripheral edge 18a of the pedestal 18 under pressure, and the joint 10 and the cap member 20 are sealed such that the space β therebetween becomes a closed space. At this time, the inner hole 14 of the pedestal 18 of the joint 10 and the inner hole 24 of the cylindrical portion 23 of the cap member 20 are superposed on each other in the direction of the axis L, and the screw chamber 11A and an interior of the bowl-shaped portion 21 of the cap member 20 are brought into communication with each other.

The plurality of grooves 19 having V-shaped cross sections are formed in the peripheral edge 18a of the pedestal 18 of the joint 10. The grooves 19 extend in a radial direction of the pedestal 18. These plurality of grooves 19 are formed such that they cross (pass through) an annular contact region between the peripheral edge 18a of the pedestal 18 of the joint 10 by the above-described crimping and the peripheral edge 25 of the inner hole 24 of the cap member 20. The plurality of grooves 19 are placed at distances from one another in the entire circumferential direction of the contact region.

Groove widths and groove depths of the plurality of grooves 19 are formed in the same manner as the plurality of grooves 27 in the above-described first embodiment. If the peripheral edge 25 of the inner hole 24 of the cap member 20 is superposed on the peripheral edge 18a of the pedestal 18 of the joint 10 by crimping the peripheral edge 25, portions of the openings of the plurality of grooves 19 are closed, and the plurality of communication passages 65 which bring inside and outside of the space β (more specifically, space β and pressure chamber 29) into communication with each other are formed.

In this Modification 5 also, like the above-described first embodiment, spatters generated at the time of resistance-welding are trapped in the space β formed between the joint 10 and the cap member 20, and fluid can flow through inside and outside of the space β through the communication passages 65.

Modification 6

Figure 10A:
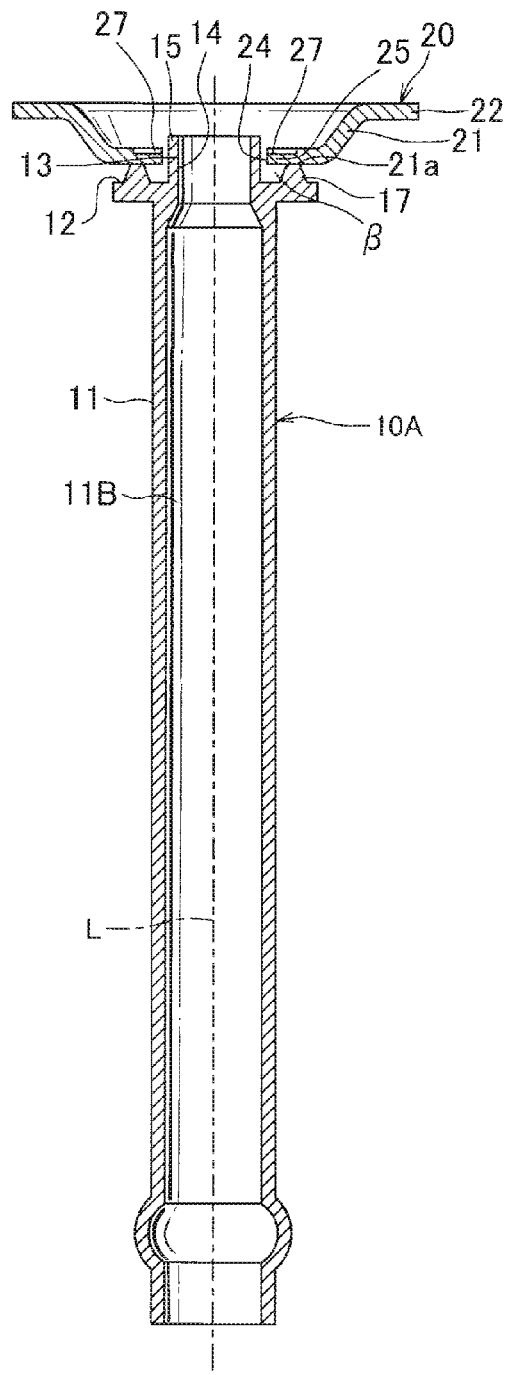
Figure 10B:
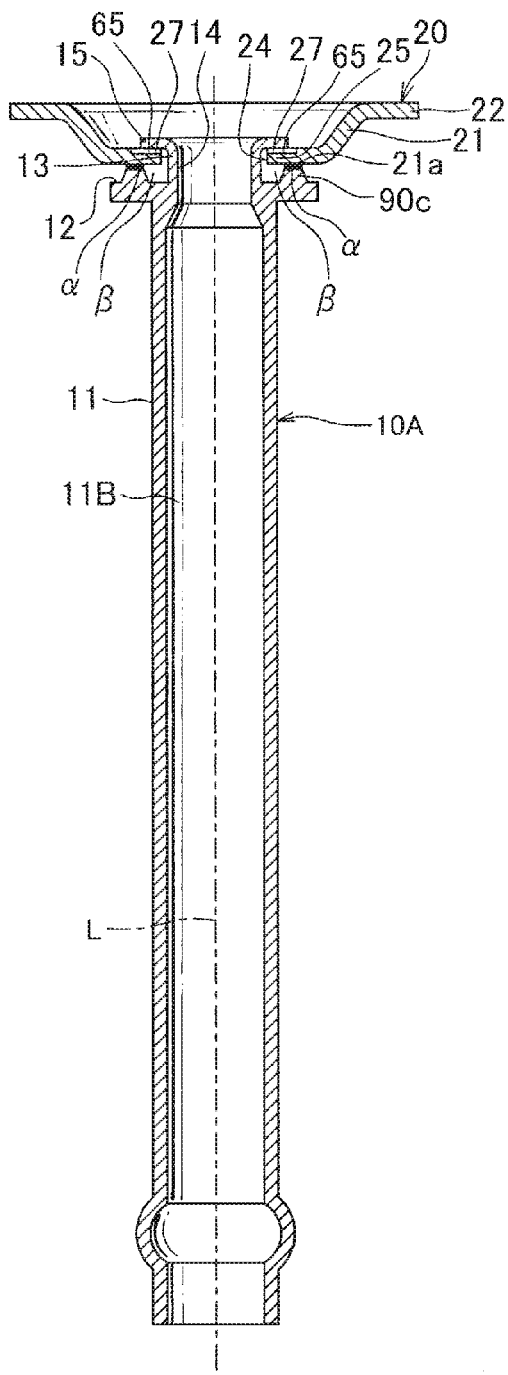

FIGS. 10A and 10B show a configuration of a modification (Modification 6) of the pressure switch of the first embodiment, in which FIG. 10A is a sectional view before a copper pipe and the cap member are bonded to each other, and FIG. 10B is a sectional view after they are bonded to each other.

As shown in FIGS. 10A and 10B, instead of the joint 10 of the first embodiment, this Modification 6 includes the copper pipe 10A which is a copper-based member as a connection member. Other configurations are the same as those of the first embodiment. This copper pipe 10A includes a body portion 11 having a flat surface 12 which is opposed to the cap member 20. An interior of the body portion 11 is a passage 11B. A cylindrical portion 13 and a projection 17 of the copper pipe 10A have the same configurations as those of the first embodiment.

In this Modification 6 also, like the above-described first embodiment, spatters generated at the time of resistance-welding are trapped in the space β formed between the copper pipe 10A and the cap member 20, and fluid can flow through inside and outside of the space β through the communication passages 65.

Second Embodiment

Next, an on-off valve according to a second embodiment of the present invention will be described with reference to FIG. 11.

Figure 11:
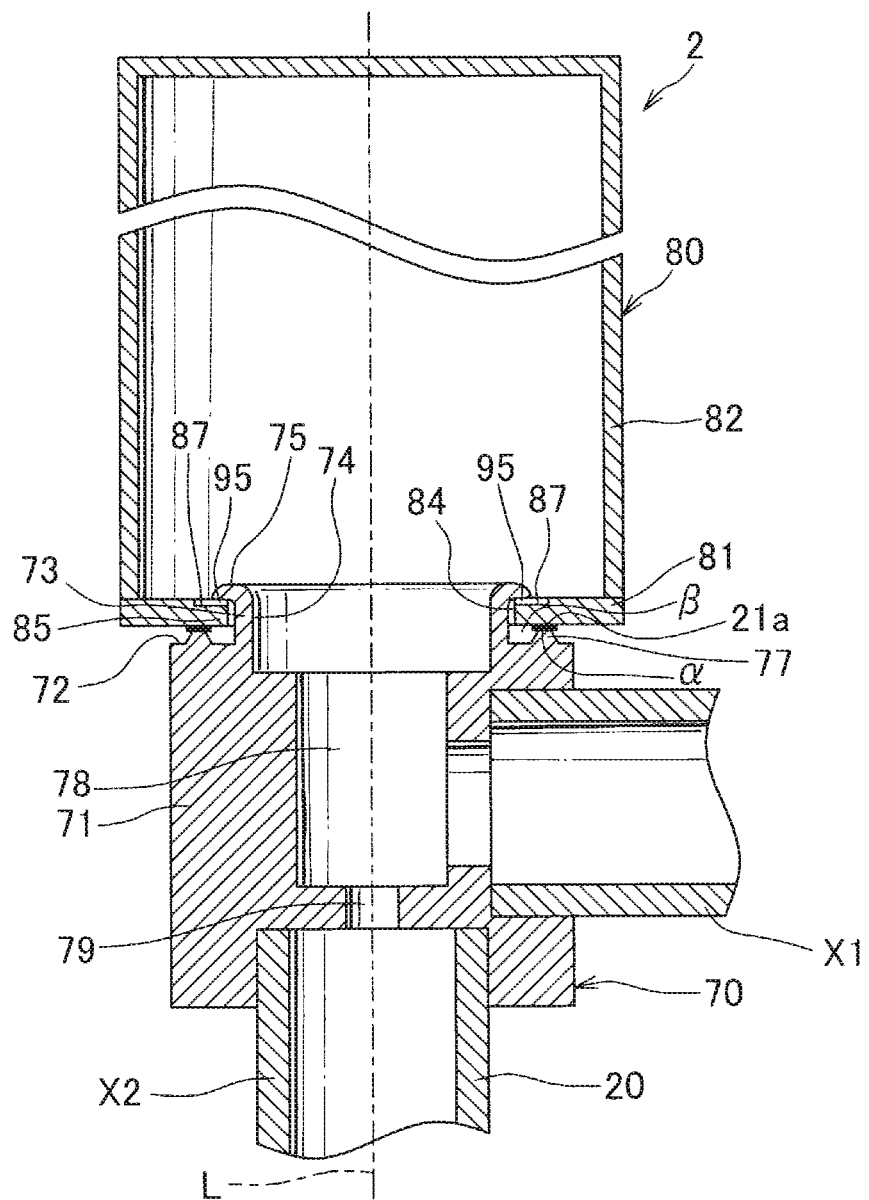
FIG. 11 is a vertical sectional view of an on-off valve according to a second embodiment of the present invention.

FIG. 11 is a vertical sectional view of the on-off valve according to the second embodiment of the present invention.

This on-off valve is one example of a valve gear, the on-off valve is connected to a pipe through which fluid such as refrigerant flows, and configures a fluid circuit. By opening and closing a valve element of the on-off valve, flow of the fluid is permitted and restricted.

As shown in FIG. 11, the on-off valve 2 includes a housing 70 made of brass which is a copper-based member as a connection member, and a case 80 made of stainless steel.

The housing 70 includes a body portion 71 having a flat surface 72 which is opposed to the later-described case 80. A valve chamber 78 and a valve port 79 which opens into the valve chamber 78 are formed inside the body portion 71. A first joint pipe X1 and a second joint pipe X2 are mounted on the housing 70, and these first joint pipe X1 and second joint pipe X2 are brought into communication with each other through the valve chamber 78 and the valve port 79. A valve element (not shown) is placed in the valve chamber 78, and a drive mechanism (not shown) or the like which drives the valve element is placed in the case body 82 of the later-described case 80. The flat surface 72 of the housing 70 is provided with a cylindrical portion 73 and a projection 77 as an annular portion.

The cylindrical portion 73 is formed into a cylindrical shape having an axis which superposes on an axis L. An inner hole 74 opens at an inner side of the cylindrical portion 73. This inner hole 74 is in communication with the valve chamber 78 of the body portion 71.

The projection 77 projects into an annular chevron-shape centering on an axis L. The projection 77 is placed at a position separating away from the cylindrical portion 73 to surround a periphery of the cylindrical portion 73.

The case 80 includes a disk-shaped case part 81 and the cylindrical case body 82. The case 80 is configured such that the housing 70 and the case part 81 are bonded to each other by projection-welding and crimping and then, the case body 82 in which the drive mechanism is accommodated is fixed to the case part 81 by welding. A circular inner hole 84 opens at a center of the case part 81. A diameter of the inner hole 84 is larger than an outer diameter of the cylindrical portion 73 and smaller than an inner diameter of the projection 77.

The housing 70 and the case part 81 are bonded to each other by projection-welding and crimping like the above-described first embodiment. In the second embodiment also, the welded portion area and the crimped portion area have rotationally symmetric shapes having an axis L as a rotation axis.

More specifically, the cylindrical portion 73 of the housing 70 is inserted into the inner hole 84 of the case part 81. According to this, the inner hole 74 of the cylindrical portion 73 and the inner hole 84 of the case part 81 are coaxially superposed on each other. The projection 77 abuts against the annular portion 81a which surrounds the inner hole 84 of a surface (surface facing downward in drawing) of the case part 81 on the side of the housing 70 and which is located at a position separating away from the inner hole 84. The annular portion 81a and the projection 77 are bonded to each other by projection-welding. This projection-welding is carried out annularly to surround the inner hole 74 of the housing 70 and the inner hole 84 of the case part 81.

By this projection-welding, a welded portion α is formed between the projection 77 and the annular portion 81a. Since the projection 77 projects from the flat surface 72, a space β is formed between the case part 81 and the housing 70 located radially inward of the projection 77. The space β is surrounded by the flat surface 72 of the housing 70, the cylindrical portion 73, the projection 77 and a surface of the case part 81 on the side of the housing 70.

By outwardly applying a load to a peripheral edge 75 of the inner hole 74 of the cylindrical portion 73 centering on the axis L, the peripheral edge 75 is crimped such that it is superposed on a peripheral edge 85 of the inner hole 84 of the case part 81. According to this, the peripheral edge 75 of the inner hole 74 of the cylindrical portion 73 is brought into contact with the peripheral edge 85 of the inner hole 84 of the case part 81 under pressure, and the peripheral edge 75 and the peripheral edge 85 are sealed such that the space β becomes a closed space.

According to this, spatters generated at the time of projection-welding between the housing 70 and the case part 81 are stored in the space β. The space β is sealed by crimping the peripheral edge 75 of the inner hole 74 of the cylindrical portion 73, and the spatters are trapped in the space β.

A plurality of grooves 87 having V-shaped cross sections is formed in the peripheral edge 85 of the inner hole 84 of the case part 81. The grooves 87 extend radially from a center of the peripheral edge 85. Like the above-described first embodiment, these grooves 87 are formed such that they radially cross (pass through) an annular contact region between the peripheral edge 75 of the inner hole 74 of the cylindrical portion 73 by the crimping and the peripheral edge 85 of the inner hole 84 of the case part 81. In the second embodiment, the grooves 87 are placed at equal distances from one another in the entire circumferential direction of the contact region. Although it is preferable that the plurality of grooves 87 are placed at equal distances from one another in the entire circumferential direction of the contact region, the grooves 87 may be placed at different distances from one another in the entire circumferential direction of the contact region. Alternatively, only one groove 87 may be provided.

These grooves 87 are formed such that groove widths and groove depths are equal to or smaller than a maximum diameter (e.g., 0.8 mm) which permits spatters generated by the projection-welding to flow out into the pipe. These grooves 87 are formed into such lengths that one ends of the grooves 87 are exposed to inside the case body 82 when the peripheral edge 75 of the inner hole 74 of the cylindrical portion 73 is superposed on the peripheral edge 85 of the inner hole 84 of the case part 81. In this embodiment, the groove widths and the groove depths are 0.2 mm. Since the peripheral edge 75 of the inner hole 74 of the cylindrical portion 73 is crimped, if the peripheral edge 75 is superposed on the peripheral edge 85 of the inner hole 84 of the case part 81, portions of openings of the plurality of grooves 87 are closed, and a plurality of communication passages 95 which bring inside and outside of the space β (more specifically, space β and case 80) into communication with each other are formed.

The plurality of communication passages 95 restrain spatters generated by the projection-welding (resistance-welding) existing in the space β from passing through the communication passages 95. More specifically, since the plurality of communication passages 95 are composed of the plurality of grooves 87, their thicknesses (inner diameters) become equal to or smaller than the maximum diameter which permits spatters to flow out into the pipe connected to the on-off valve 2, and this restrains spatters exceeding the maximum diameter from passing.

Next, an operation of the above-described on-off valve 2 according to the present invention will be described.

Since the on-off valve 2 is connected to the pipe through which fluid flows, the on-off valve 2 configures the fluid circuit together with the pipe. By opening and closing motion of the valve element, the on-off valve 2 permits or restricts flow of the fluid. When the fluid circuit is actually operated, fluid flows into or out from the space β between the housing 70 and the case part 81 through the plurality of communication passages 95. At this time, the plurality of communication passages 95 restrain spatters generated at the time of projection-welding existing in the space β from passing through the communication passages 95, and this restrains spatters from flowing outside of the space β.

When temperature of fluid flowing in the pipe changes and abruptly rises due to a switching operation of the fluid circuit, the fluid in the space β expands by the vaporization. In this case, the expanded portion of fluid is released from the plurality of communication passages 95 to outside of the space β, and this restrains the pressure in the space β from rising.

From the above fact, this embodiment includes the metal housing 70 formed with the inner hole 74 through which fluid flows, and the metal case part 81 formed with the inner hole 84. The inner hole 84 is coaxially superposed on the inner hole 74 of the housing 70. The housing 70 and the case part 81 are bonded to each other by the projection-welding carried out annularly to surround the respective inner holes 74 and 84. The entire circumference of the peripheral edge 75 of the inner hole 74 of the housing 70 is crimped and connected to the case part 81 such that the closed space β is formed between the housing 70 and the case part 81 inside the projection 77. The communication passages 95 are provided such that they pass through the annular contact region between the housing 70 and the case part 81 which are in contact with each other by crimping and connecting the peripheral edge 75 of the inner hole 74 of the housing 70 to the case part 81. The communication passages 95 bring inside and outside of the space β into communication with each other. The communication passages 95 are formed such that they permit fluid to pass through the communication passages 95 and restrain spatters generated by resistance-welding from passing through the communication passages 95.

According to this, spatters generated at the time of resistance-welding are trapped in the space β formed between the housing 70 and the case part 81, and fluid can flow through inside and outside of the space β through the communication passages 95. According to this, even if fluid stored in the space β in which spatters at the time of resistance-welding are trapped expands and pressure in the space β rises, it is possible to release the pressure from the communication passages 95 to outside of the space β. Hence, it is possible to suppress deformation of the housing 70 and the case part 81 which may adversely be generated by expansion of fluid stored in the space β in which spatters at the time of resistance-welding are trapped.

The communication passages 95 are composed of the plurality of grooves 87 formed in the case part 81. According to this, the communication passages 95 can be configured by the grooves 87 which can easily be formed by press working, cutting working and laser irradiation. Hence, it is possible to more easily suppress deformation of the connection member and the case part which may adversely be generated by expansion of fluid stored in the space β in which spatters at the time of resistance-welding are trapped.

The plurality of grooves 87 configuring the communication passages 95 is provided, and these grooves 87 are placed at distances from one another in the entire circumferential direction of the contact region. According to this, since the plurality of communication passages 95 are placed evenly in the circumferential direction of the space β formed between the housing 70 and the case part 81, pressure in the space β can evenly be released in the circumferential direction. Hence, it is possible to more easily suppress deformation of the connection member and the case part which may adversely be generated by expansion of fluid stored in the space β in which spatters at the time of resistance-welding are trapped.

Although the present invention has been described based on the preferred embodiments, the fluid-related function device of the invention is not limited to the configurations of the embodiments.

In the first embodiment, the plurality of grooves 27 having the V-shaped cross sections and radially extending from the center of the peripheral edge 25 of the inner hole 24 of the cap member 20 are formed in the peripheral edge 25, and these plurality of grooves 27 configure the plurality of communication passages 65, but the invention is not limited to this configuration. Modifications thereof will be described with reference to FIGS. 12 and 13.

Figure 12:
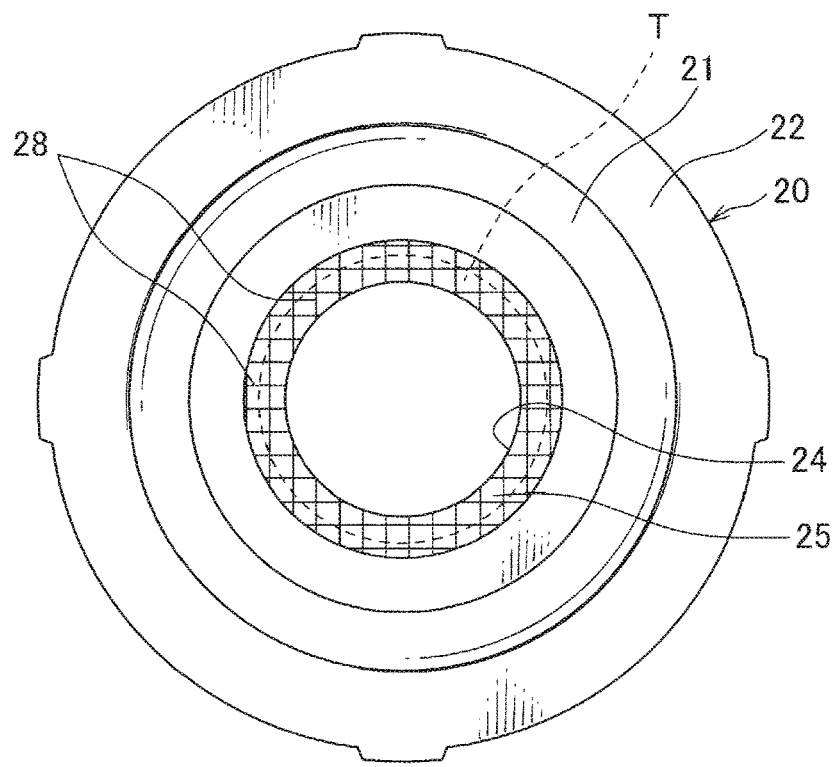
FIG. 12 is a plan view showing a configuration of a modification (plurality of grooves placed in lattice form) of the cap member possessed by the pressure switch of the first embodiment.
Figure 13:
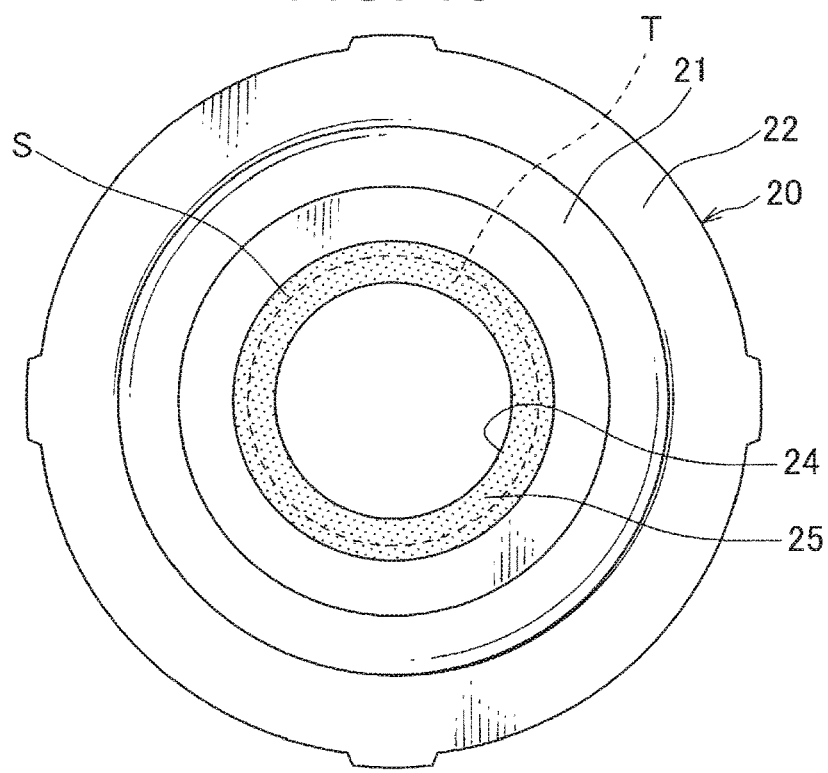
FIG. 13 is a plan view showing a configuration of another modification (surface roughening) of the cap member possessed by the pressure switch of the first embodiment.

FIG. 12 is a plan view showing a configuration of a modification (plurality of grooves placed in lattice form) of the cap member possessed by the pressure switch of the first embodiment. FIG. 13 is a plan view showing a configuration of another modification (surface roughening) of the cap member possessed by the pressure switch of the first embodiment.

For example, in the first embodiment, instead of the plurality of radially extending grooves 27, a plurality of grooves 28 having V-shaped cross sections are placed in a lattice form in the peripheral edge 25 of the inner hole 24 of the cap member 20 as schematically shown in FIG. 12, and the plurality of grooves 28 placed in the lattice form may configure the plurality of communication passages. The plurality of grooves 28 placed in the lattice form are placed such that they include the entire annular contact region T between the peripheral edge 15 of the inner hole 14 of the cylindrical portion 13 by the above-described crimping and the peripheral edge 25 of the inner hole 24 of the cap member 20, and the plurality of communication passages configured by the plurality of grooves placed in the lattice form pass through the contact region T.

According to this, since the plurality of communication passages are substantially evenly placed in the circumferential direction of the space β formed between the joint 10 and the cap member 20, pressure in the space β can substantially evenly be released in the circumferential direction. Hence, it is possible to further suppress deformation of the joint 10 and the cap member 20 which may adversely be generated by expansion of fluid stored in the space β in which spatters at the time of resistance-welding are trapped.

Alternatively, in the first embodiment, instead of the plurality of radially extending grooves 27, as schematically shown in FIG. 13, a rough surface portion S is formed on the peripheral edge 25 of the inner hole 24 of the cap member 20 by surface roughening such as sandblasting, etching, laser working, and scratching, and the communication passages may be configured by connecting concave portions of the rough surface portion S to each other. This surface roughening is carried out such that communication passages configured by surface roughening permit fluid to pass through the communication passages and restrain spatters generated by resistance-welding from passing through the communication passages, and it is preferable that a maximum height of the rough surface is about Rz 100 to Rz 800. In FIG. 13, the surface roughening is carried out to include the entire annular contact region T between the peripheral edge 15 of the inner hole 14 of the cylindrical portion 13 by the above-described crimping and the peripheral edge 25 of the inner hole 24 of the cap member 20.

According to this, the communication passages are formed in the substantially mesh form in the entire contact region T. That is, the plurality of communication passages are placed substantially evenly in the circumferential direction of the space β formed between the joint 10 and the cap member 20. Therefore, pressure in the space β can substantially evenly be released in the circumferential direction. Hence, it is possible to further suppress the deformation of the joint 10 and the cap member 20 which may adversely be generated by expansion of fluid stored in the space in which spatters at the time of resistance-welding are trapped.

Alternatively, the surface roughening may be carried out only in a portion of the contact region T in the circumferential direction in the configuration shown in FIG. 13.

Although the plurality of grooves 27, the plurality of grooves 28 and the rough surface portion S are provided in the cap member 20 in the first embodiment and its modifications, these elements may be provided in the joint 10.

The configuration having the plurality of grooves placed in the lattice form, and the configuration in which the surface roughening is carried out may be applied to the Modifications 1 to 6 of the first embodiment and to the second embodiment.

The communication passages 65 pass through the contact region between the joint 10 and the cap member 20 and bring inside and outside of the space β into communication with each other in the first embodiment and its modifications, but the invention is not limited to this configuration.

Figure 14:
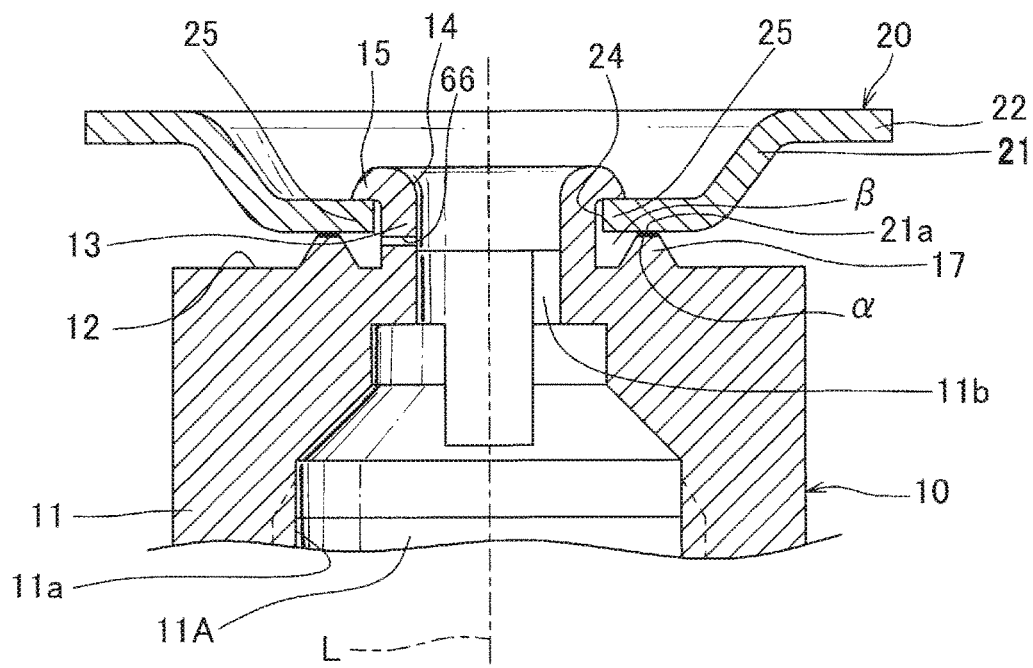
FIG. 14 is a sectional view showing a configuration of a modification of a communication passage of the pressure switch of the first embodiment.
Figure 15:
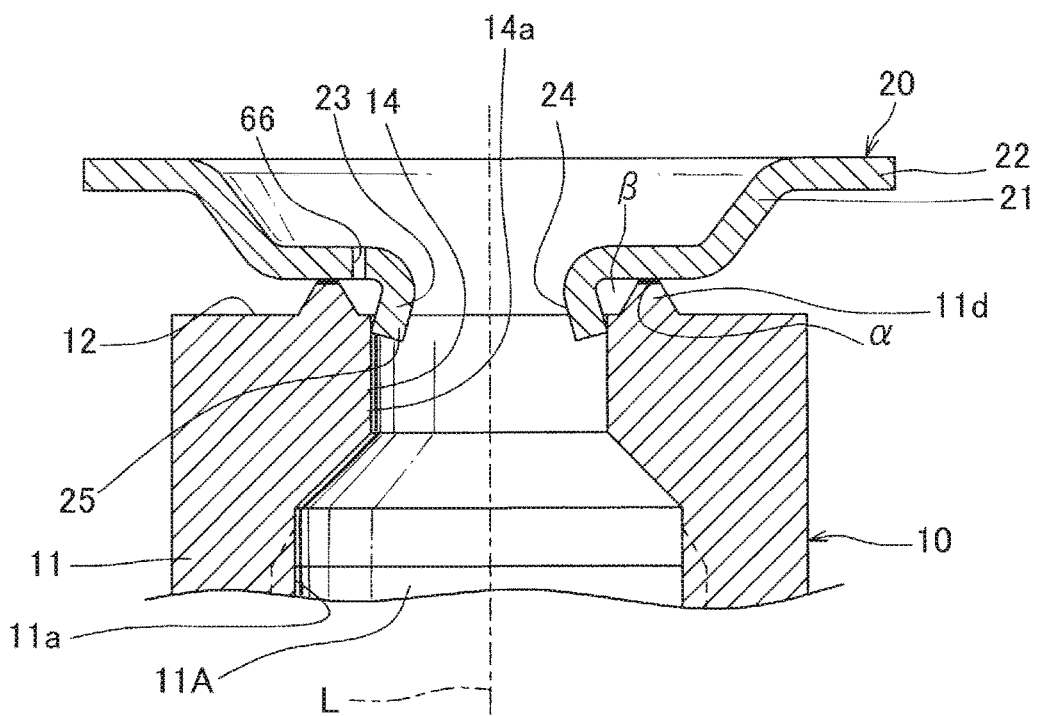
FIG. 15 is a sectional view showing a configuration of another modification of the communication passage of the pressure switch of the first embodiment.
Figure 16:
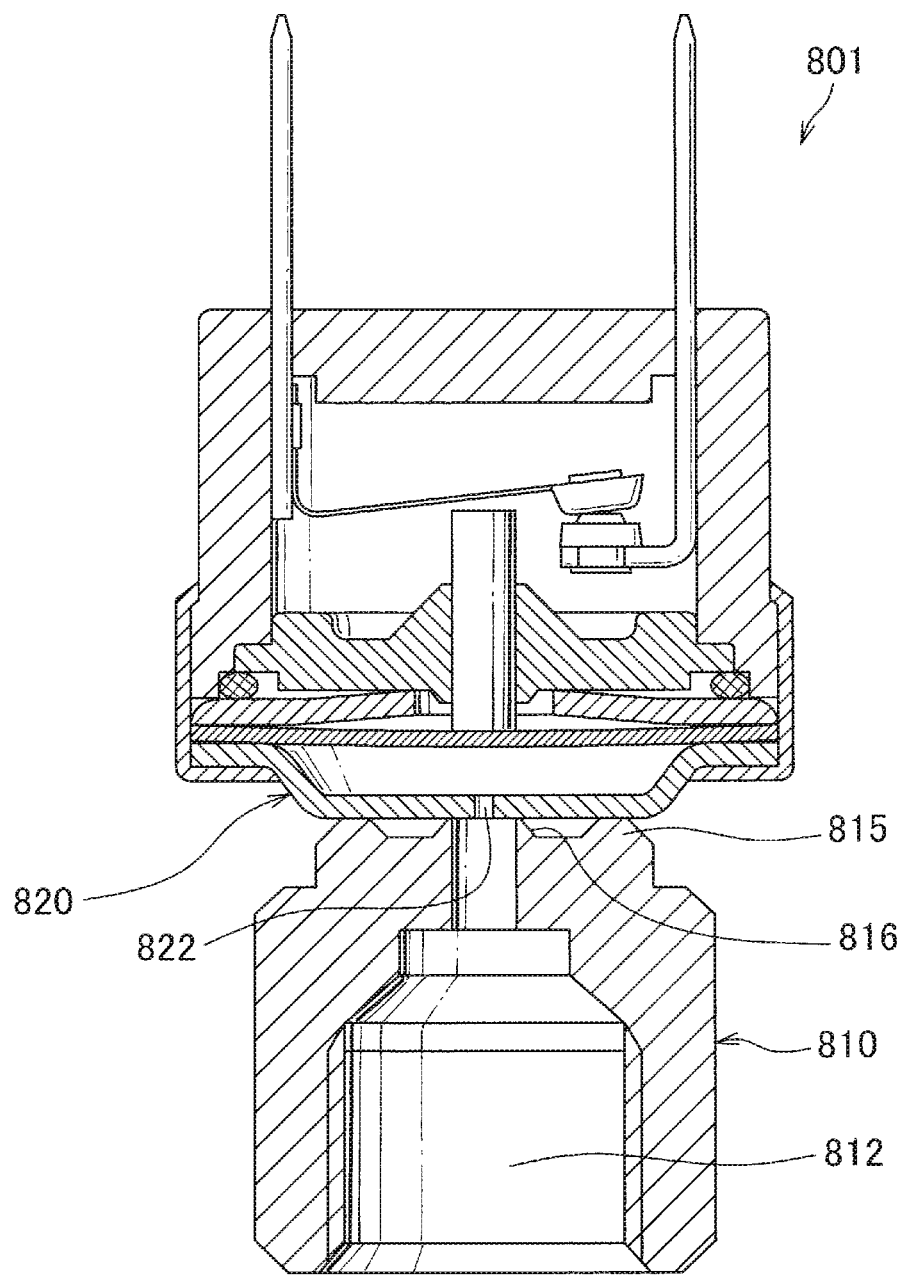
FIG. 16 is a vertical sectional view of a conventional pressure switch.
Figure 17:
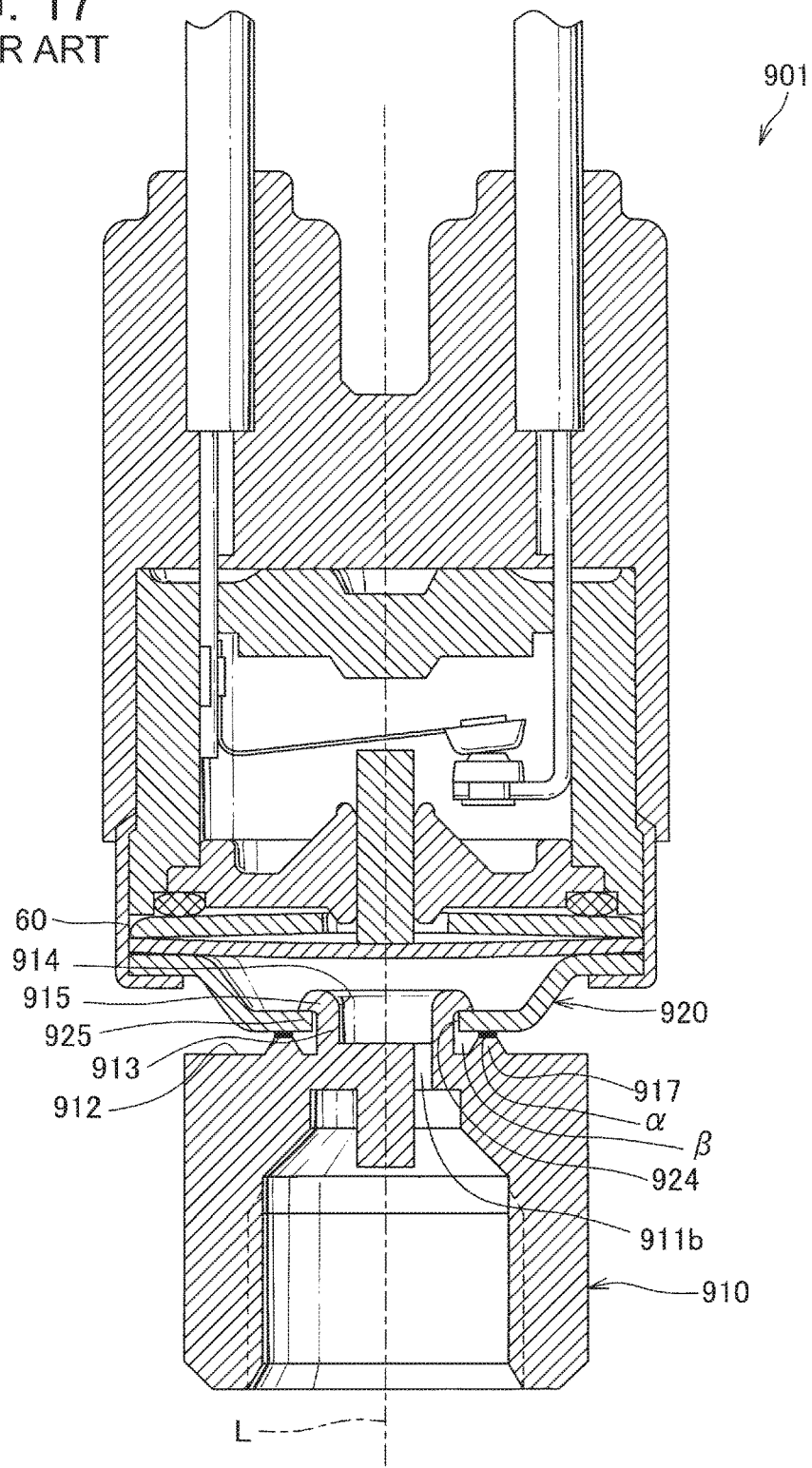
FIG. 17 is a vertical sectional view of another conventional pressure switch.
Figure 18:
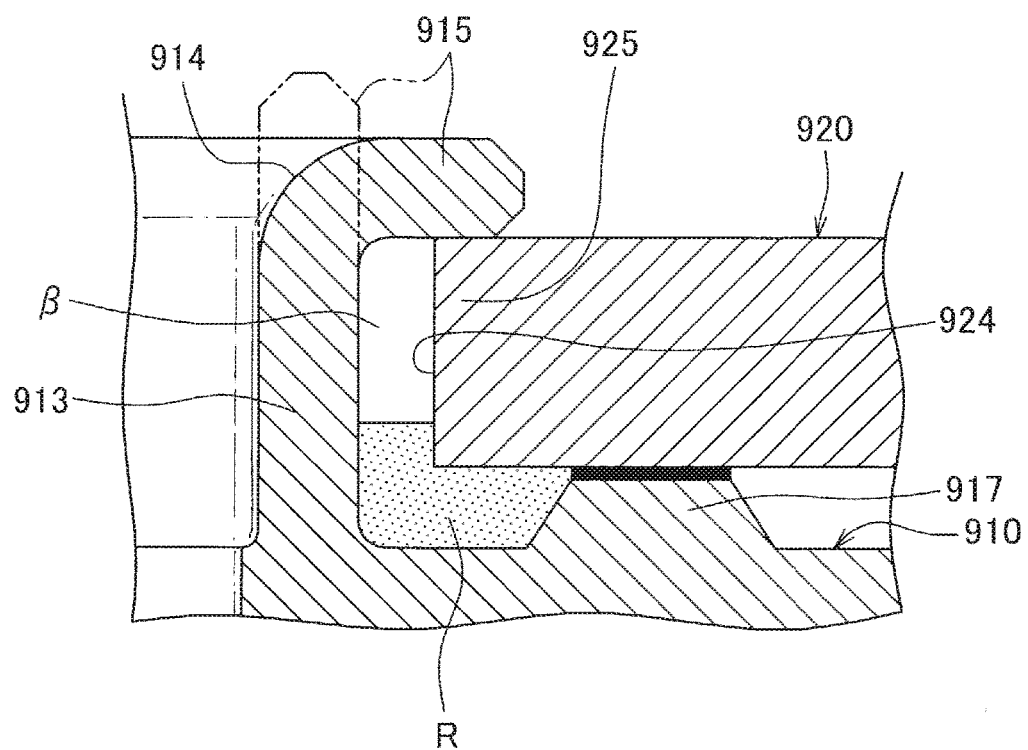
FIG. 18 is an enlarged sectional view of a space between a joint and a cap member in the pressure switch in FIG. 17.

As shown in FIG. 14 for example, it is possible to provide communication passages 66 which pass through the cylindrical portion 13 of the joint 10 and which bring the space β and inside of the joint 10 (i.e., inner hole 14) into communication with each other. Alternatively, it is possible to provide communication passages 66 which pass through the bowl-shaped portion 21 of the cap member 20 and which bring the space β and inside of the cap member 20 into communication with each other as shown in FIG. 15. The communication passages 66 of these configurations bring the space β and the passage through which fluid flows into communication with each other, and restrain spatters generated by resistance-welding from passing through the communication passages 66. These communication passages 66 may be provided in both the joint 10 and the cap member 20. That is, if the communication passages 66 which bring inside and outside of the space β into communication with each other are provided in at least one of the joint 10 and the cap member 20 and the communication passages 66 permit fluid to pass through the communication passages 66 and restrain spatters generated by resistance-welding from passing through the communication passages 66, the communication passages 66 may penetrate the joint 10 or the cap member 20, and a configuration thereof is not limited. The same is applied also to the second embodiment.

Although the first embodiment and its Modifications 1 to 6 are described based on the pressure switch which is the pressure sensitive device, the structures of the joint 10 and the cap member 20 are the same also in the pressure sensor, and the present invention may be applied to the pressure sensor which is the pressure sensitive device. Although the second embodiment is described based on the on-off valve which is the valve gear, the second embodiment may also be applied to a flow rate control valve, a solenoid valve, an electric operated valve, a slide valve and the like which are valve gears. That is, the present invention can be applied to the pressure sensitive device, the valve gear and other devices having a function related to fluid.

In the embodiments, the connection member made of copper-based member as material and the case part made of stainless steel as material are resistance-welded to each other, but the present invention is not limited to this, but metal materials configuring the connection member and the case part are not limited only if they can be resistance-welded to each other and the materials do not go counter to the object of the invention.

Only one of annular locations where the connection member and the case part are projection-welded to each other may project, or both of the annular locations may project.

The above-described embodiments only show typical modes of the present invention, and the invention is not limited to the embodiments. That is, a person skilled in the art can variously modify the invention within a scope not departing from the subject matter of the invention. Such modifications are included in a category of the present invention of course as long as the modifications have the configuration of the fluid-related function device of the invention.

REFERENCE SIGN LIST

First Embodiment

1 pressure switch (fluid-related function device)
10 joint (connection member)
13 cylindrical portion
14 inner hole
15 peripheral edge
17 projection
19 plurality of grooves
20 cap member (case part)
21a annular portion
24 inner hole
25 peripheral edge
27 plurality of grooves 29 pressure chamber
65 communication passage
T contact region Second Embodiment 2 on-off valve (fluid-related function device)
70 housing (connection member)
73 cylindrical portion
74 inner hole
75 peripheral edge
77 projection
80 case
81 case part
81a annular portion
82 case body
84 inner hole
85 peripheral edge
87 plurality of grooves
95 communication passage

The invention claimed is:

1. A fluid-related function device comprising:
a metal connection member formed with an inner hole through which fluid flows; and
a metal case part formed with another inner hole superposed on the former inner hole,
the connection member and the case part being bonded to each other by projection-welding which is carried out annularly to surround the respective inner holes, wherein
an entire peripheral edge of the inner hole of one of the connection member and the case part is crimped and connected to the other such that a closed space is formed between the connection member and the case part inside a location where the projection-welding is carried out,
at least one of the connection member and the case part is provided with a communication passage which is composed of a plurality of grooves extending radially from a center of the peripheral edge and brings inside and outside of the space into communication with each other, and
the communication passage is formed such that it permits the fluid to pass through the communication passage and restrains spatters generated by the projection-welding from passing through the communication passage.

2. A fluid-related function device comprising:
a metal connection member formed with an inner hole through which fluid flows; and
a metal case part formed with another inner hole superposed on the former inner hole,
the connection member and the case part being bonded to each other by projection-welding which is carried out annularly to surround the respective inner holes, wherein
an entire peripheral edge of the inner hole of one of the connection member and the case part is crimped and connected to the other such that a closed space is formed between the connection member and the case part inside a location where the projection-welding is carried out,
the fluid-related function device is provided with a communication passage, the communication passage passes through an annular contact region between the connection member and the case part in which the peripheral edge of the inner hole of the one of the connection member and the case part is crimped and connected to the other, and the communication passage is composed of a plurality of grooves extending radially from a center of the peripheral edge and brings inside and outside of the space into communication with each other, and
the communication passage is formed such that it permits the fluid to pass through the communication passage and restrains spatters generated by the projection-welding from passing through the communication passage.

3. The fluid-related function device according to claim 2, wherein the communication passage includes one or a plurality of grooves formed in the connection member or the case part.

4. The fluid-related function device according to claim 3, wherein the plurality of grooves are provided, and the grooves are placed at a distance from one another in an entire circumferential direction of the contact region.

5. The fluid-related function device according to claim 3, wherein the plurality of grooves are provided, and the grooves are placed in a lattice form at least in the entire contact region.

6. The fluid-related function device according to claim 2, wherein concave portions are configured by surface roughening which is carried out at least on one of the connection member and the case part, and the communication passage is configured by connecting the concave portions to one another.

7. The fluid-related function device according to claim 6, wherein the surface roughening is carried out at least on the entire contact region.

* * * * *